(12) United States Patent
Liu et al.

(10) Patent No.: US 12,375,124 B2
(45) Date of Patent: Jul. 29, 2025

(54) METHOD AND APPARATUS FOR SERVICE CONTINUITY ACROSS LF AND MMWAVE

(71) Applicant: Futurewei Technologies, Inc., Plano, TX (US)

(72) Inventors: Bin Liu, San Diego, CA (US); Haibo Xu, Beijing (CN); Pengfei Xia, San Diego, CA (US); Nathan Edward Tenny, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 771 days.

(21) Appl. No.: 17/431,481

(22) PCT Filed: Apr. 29, 2019

(86) PCT No.: PCT/CN2019/084956
§ 371 (c)(1),
(2) Date: Aug. 17, 2021

(87) PCT Pub. No.: WO2020/168635
PCT Pub. Date: Aug. 27, 2020

(65) Prior Publication Data
US 2022/0140861 A1    May 5, 2022

Related U.S. Application Data

(60) Provisional application No. 62/807,506, filed on Feb. 19, 2019.

(51) Int. Cl.
*H04B 1/74* (2006.01)
*H04W 72/0453* (2023.01)

(52) U.S. Cl.
CPC ........ *H04B 1/745* (2013.01); *H04W 72/0453* (2013.01)

(58) Field of Classification Search
None
See application file for complete search history.

(56) References Cited

U.S. PATENT DOCUMENTS 9,716,558 B1 * 7/2017 Buthler ............... H04B 17/309
10,136,430 B2   11/2018 Wang
(Continued)

FOREIGN PATENT DOCUMENTS

| CN | 104768199 A | 7/2015 |
|---|---|---|
| CN | 106792844 A | 5/2017 |
| CN | 107079512 A | 8/2017 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", Technical Specification, 3GPP TS 37.340 V15.4.0, Dec. 2018, 67 Pages.
(Continued)

*Primary Examiner* — Hassan A Phillips
*Assistant Examiner* — Gautam Sharma
(74) *Attorney, Agent, or Firm* — Slater Matsil, LLP

(57) ABSTRACT

A data packet, that is to be transmitted in a dual connectivity (DC) or carrier aggregation (CA) based communications system, may include an indication to indicate whether the data packet is configured to be transmitted in a first frequency of a first carrier or a second frequency of a second carrier, and be transmitted, by a communication device, in the first frequency or the second frequency based on the indication. A data packet in the communications system may also be transmitted first in a first frequency higher than a second frequency, and then be retransmitted in the second frequency upon transmission failure of the data packet in the first frequency.

25 Claims, 13 Drawing Sheets

(56) References Cited

U.S. PATENT DOCUMENTS

| | | | | |
|---|---|---|---|---|
| 10,728,009 | B1* | 7/2020 | Lekutai | H04W 72/51 |
| 10,965,434 | B1* | 3/2021 | Babaei | H04W 72/23 |
| 11,490,448 | B1* | 11/2022 | Kuo | H04W 76/22 |
| 11,974,359 | B2* | 4/2024 | Zhu | H04L 65/1016 |
| 2014/0341139 | A1* | 11/2014 | Hu | H04L 5/0044 |
| | | | | 370/329 |
| 2015/0078743 | A1* | 3/2015 | Yang | H04B 10/564 |
| | | | | 398/38 |
| 2015/0334737 | A1* | 11/2015 | Susitaival | H04W 28/0263 |
| | | | | 370/329 |
| 2016/0149686 | A1* | 5/2016 | Tsai | H04L 1/18 |
| | | | | 370/329 |
| 2016/0234820 | A1* | 8/2016 | Mallik | H04L 1/1861 |
| 2017/0251470 | A1 | 8/2017 | Wang | |
| 2018/0241797 | A1* | 8/2018 | Báder | H04L 43/12 |
| 2019/0045404 | A1* | 2/2019 | Tsai | H04W 36/00224 |
| 2019/0215095 | A1* | 7/2019 | Park | H04W 72/0453 |
| 2019/0305915 | A1* | 10/2019 | Zhu | H04L 5/22 |
| 2019/0313272 | A1* | 10/2019 | Zhou | H04W 24/10 |
| 2019/0373504 | A1* | 12/2019 | Beard | H04L 1/08 |
| 2019/0386784 | A1* | 12/2019 | Tang | H04L 1/1822 |
| 2019/0394688 | A1* | 12/2019 | Zhu | H04W 36/0058 |
| 2020/0029389 | A1* | 1/2020 | Yilmaz | H04W 8/08 |
| 2020/0136771 | A1* | 4/2020 | Xu | H04L 5/0032 |
| 2020/0229076 | A1* | 7/2020 | Jin | H04W 72/04 |
| 2020/0359276 | A1* | 11/2020 | Lee | H04W 36/0085 |
| 2020/0382431 | A1* | 12/2020 | Decarreau | H04L 1/08 |
| 2021/0134074 | A1* | 5/2021 | Fujita | H04W 4/44 |
| 2021/0251032 | A1* | 8/2021 | Wang | H04W 76/15 |
| 2022/0134407 | A1* | 5/2022 | Tanigawa | B21J 5/08 |
| | | | | 72/58 |
| 2022/0141710 | A1* | 5/2022 | Xu | H04W 48/08 |
| | | | | 370/329 |
| 2022/0201786 | A1* | 6/2022 | Tsai | H04W 76/20 |

OTHER PUBLICATIONS

"3rd Generation Partnership Project; Technical Specification Group Radio Access Network; NR; NR and NG-RAN Overall Description; Stage 2 (Release 15)", Technical Specification, 3GPP TS 38.300 V15.4.0, Dec. 2018, 97 Pages.

"3rd Generation Partnership Project; Technical Specification Group Services and System Aspects; Vocabulary for 3GPP Specifications, (Release 15)", Technical Report, 3GPP TR 21.905, V15.0.0, Mar. 2018, 66 Pages.

"3rd Generation Partnership Project; Technical Specification Group Radio Access Network; NR; Medium Access Control (MAC) protocol specification, (Release 15)", Technical Specification, 3GPP TS 38.321 V15.4.0, Dec. 2018, 77 Pages.

* cited by examiner

METHOD AND APPARATUS FOR SERVICE CONTINUITY ACROSS LF AND MMWAVE

CROSS-REFERENCE TO RELATED APPLICATIONS

This application is a National Stage of International Application No. PCT/CN2019/084956, filed on Apr. 29, 2019, which claims priority to U.S. Provisional Patent Application No. 62/807,506, filed on Feb. 19, 2019. Both of the aforementioned applications are hereby incorporated by reference in their entireties.

TECHNICAL FIELD

The present disclosure relates generally to wireless communications, and, in particular embodiments, to a method and apparatus for service continuity across LF and mmWave.

BACKGROUND

Millimeter wave (mmWave) has been introduced for wireless communications because of the large available bandwidth in the mmWave bands, which may be used to provide high data throughput. mmWave communications, however, suffer server path loss, and beamforming is generally required at both transmit and receive ends. By use of high beamforming gains, the pass loss may be compensated. Nevertheless, beam based mmWave communications is vulnerable to UE movement and blockage. For example, mmWave links are very susceptible to obstacles blocking the direct line-of-sight (LOS) paths or non-LOS paths for communication. This vulnerability reduces robustness in beam based mmWave communications, and hence degrades user experience. It would be desirable to provide mechanisms that can make use of mmWave benefits for communications while providing robust services.

SUMMARY

A first aspect relates to a method for wireless communications, the method comprising transmitting, by a communication device configured to communicate in a first frequency of a first carrier and a second frequency of a second carrier, a data packet according to an indication of the data packet, wherein the indication indicates whether the data packet is configured to be transmitted in the first frequency or the second frequency, and the first frequency is different than the second frequency. The indication of the data packet facilitates transmission of the data packet using the first frequency of the first carrier and the second frequency of a second carrier.

The method facilitates communications across different frequencies, such as a high frequency (HF), e.g., a frequency above 6 GHz or in an mmWave band, and a low frequency (LF), e.g., a frequency below 6 GHz, mitigates the link fragility effect in mmWave communications, and thus improves user experience in the DC or CA based communications system.

In a first implementation form of the method according to the first aspect as such, the communication device is a base station.

In a second implementation form of the method according to the first aspect as such, the communication device is a user equipment (UE).

In a third implementation form of the method according to the first aspect as such, the UE is configured to communicate with a first base station in the first frequency and with a second base station in the second frequency, and the data packet is mapped to a split bearer. Thus, transmission of the data packet mapped to the split bearer may be facilitated based on the indication.

In a fourth implementation form of the method according to the first aspect as such, both the first base station and the second base station are gNBs.

In a fifth implementation form of the method according to the first aspect as such, both the first base station and the second base station are new radio compliant base stations.

In a sixth implementation form of the method according to the first aspect as such, one of the first base station and the second base station is an eNB, and the other one of the first base station and the second base station is an en-gNB.

In a seventh implementation form of the method according to the first aspect as such, one of the first base station and the second base station is an ng-eNB, and the other one of the first base station and the second base station is a gNB.

In an eighth implementation form of the method according to the first aspect as such or any preceding implementation form of the first aspect, one of the first base station and the second base station is a gNB, and the other one of the first base station and the second base station is an ng-eNB.

In a ninth implementation form of the method according to the first aspect as such or any preceding implementation form of the first aspect, one of the first base station and the second base station is a master node, and the other one of the first base station and the second base station is a secondary node.

In a tenth implementation form of the method according to the first aspect as such or any preceding implementation form of the first aspect, wherein one of the first frequency and the second frequency is in a frequency band above 6 GHz, and the other one is in a frequency band below 6 GHz.

In an eleventh implementation form of the method according to the first aspect as such or any preceding implementation form of the first aspect, the first frequency and the second frequency are in a frequency band above 6 GHz.

In a twelfth implementation form of the method according to the first aspect as such or any preceding implementation form of the first aspect, transmitting the data packet comprises transmitting, by the communication device, the data packet over the first carrier upon determining that the data packet is configured to be transmitted in the first frequency according to the indication, or transmitting, by the communication device, the data packet over the second carrier upon determining that the data packet is configured to be transmitted in the second frequency according to the indication.

In a thirteenth implementation form of the method according to the first aspect as such or any preceding implementation form of the first aspect, the indication indicates a priority level of the data packet, where the priority level is associated with one of the first frequency and the second frequency.

In a fourteenth implementation form of the method according to the first aspect as such or any preceding implementation form of the first aspect, the indication indicates a first priority level of the data packet, and the first priority level is higher than a second priority level, wherein transmitting the data packet comprises transmitting the data packet in the first frequency that is lower than the second frequency.

In a fifteenth implementation form of the method according to the first aspect as such or any preceding implementation form of the first aspect, the first carrier is associated with a first logical channel, and the second carrier is associated with a second logical channel that is a duplicate of the first logical channel. This facilitates transmission of the data packet in different frequencies associated with the first logical channel and the duplicate of the first logical channel.

In a sixteenth implementation form of the method according to the first aspect as such or any preceding implementation form of the first aspect, the indication is comprised in a header of the data packet.

A second aspect relates to a method for wireless communications, the method comprising transmitting, by a communication device configured to communicate in a first frequency of a first carrier and a second frequency of a second carrier, a data packet in the first frequency, wherein the first frequency is higher than the second frequency, and transmitting, by the communication device, the data packet in the second frequency upon determining that transmission of the data packet in the first frequency has failed.

The method facilitates transmission of data packet across different frequencies, such as a high frequency (HF), e.g., a frequency above 6 GHz, and a low frequency (LF), e.g., a frequency below 6 GHz. One frequency may be used to continue transmission of the data packet in the case of transmission of the data packet in another frequency being unsuccessful. This improves communication continuity and user experience.

In a first implementation form of the method according to the second aspect as such, the first frequency is in a frequency band above 6 GHz, and the second frequency is in a frequency band that is below 6 GHz.

In a second implementation form of the method according to the second aspect as such, the first frequency and the second frequency are in a frequency band.

In a third implementation form of the method according to the second aspect as such, the method further comprises retransmitting, by the communication device, the data packet in the first frequency before transmitting the data packet in the second frequency.

In a fourth implementation form of the method according to the second aspect as such or any preceding implementation form of the second aspect, the method further comprises: determining, by the communication device, that the transmission of the data packet in the first frequency has failed upon determining that the data packet has been retransmitted in the first frequency for a predetermined number of times.

In a fifth implementation form of the method according to the second aspect as such or any preceding implementation form of the second aspect, the communication device is a base station.

In a sixth implementation form of the method according to the second aspect as such or any preceding implementation form of the second aspect, the communication device is a user equipment (UE).

In a seventh implementation form of the method according to the second aspect as such, the UE is configured to communicate with a first base station in the first frequency and with a second base station in the second frequency, and the data packet is mapped to a split bearer.

In an eighth implementation form of the method according to the second aspect as such, both the first base station and the second base station are gNBs.

In a ninth implementation form of the method according to the second aspect as such, both the first base station and the second base station are new radio compliant base stations.

In a tenth implementation form of the method according to the second aspect as such, the first base station is an en-gNB and the second base station is an eNB.

In a eleventh implementation form of the method according to the second aspect as such, the first base station is a gNB and the second base station is an ng-eNB.

In a twelfth implementation form of the method according to the second aspect as such, the first base station is a gNB and the second base station is an ng-eNB.

In a thirteenth implementation form of the method according to the second aspect as such or any preceding implementation form of the second aspect, one of the first base station and the second base station is a master node and the other one is a secondary node.

In a fourteenth implementation form of the method according to the second aspect as such or any preceding implementation form of the second aspect, one of the first carrier and the second carrier is associated with a first logical channel, and the other one of the first carrier and the second carrier is associated with a second logical channel that is a duplicate of the first logical channel.

A third aspect relates to a method for wireless communications, the method comprising determining, by a first base station configured to provide dual connectivity (DC) based communications with a second base station, whether a data packet is configured to be transmitted in a first frequency of a first carrier or a second frequency of a second carrier according to an indication comprised in the data packet, the first frequency being different than the second frequency, transmitting, by the first base station, the data packet in the first frequency upon determining that the indication indicates to transmit the data packet in the first frequency, the first base station configured to communicate in the first frequency of the first carrier, and directing, by the first base station, the second base station to transmit the data packet in the second frequency upon determining that the indication indicates to transmit the data packet in the second frequency, wherein the second base station is configured to communicate in the second frequency of the second carrier.

The method facilitates communications across different frequencies, such as a high frequency (HF), e.g., a frequency above 6 GHz or in an mmWave band, and a low frequency (LF), e.g., a frequency below 6 GHz, mitigates the link fragility effect in mmWave communications, and thus improves user experience in DC based communications systems.

In a first implementation form of the method according to the third aspect as such, the data packet is in a split bearer.

In a second implementation form of the method according to the third aspect as such or any preceding implementation form of the third aspect, both the first base station and the second base station are gNBs.

In a third implementation form of the method according to the third aspect as such or any preceding implementation form of the third aspect, both the first base station and the second base station are new radio compliant base stations.

In a fourth implementation form of the method according to the third aspect as such or any preceding implementation form of the third aspect, one of the first base station and the second base station is an eNB, and the other one of the first base station and the second base station is an en-gNB.

In a fifth implementation form of the method according to the third aspect as such or any preceding implementation form of the third aspect, one of the first base station and the second base station is an ng-eNB, and the other one of the first base station and the second base station is a gNB.

In a sixth implementation form of the method according to the third aspect as such or any preceding implementation form of the third aspect, one of the first base station and the second base station is a gNB, and the other one of the first base station and the second base station is an ng-eNB.

In a seventh implementation form of the method according to the third aspect as such or any preceding implementation form of the third aspect, one of the first base station and the second base station is a master node, and the other one is a secondary node.

In an eighth implementation form of the method according to the third aspect as such or any preceding implementation form of the third aspect, one of the first frequency and the second frequency is in a frequency band above 6 GHz, and the other one is in a frequency band that is below 6 GHz.

In a ninth implementation form of the method according to the third aspect as such, the first frequency and the second frequency are in a frequency band above 6 GHz.

In a tenth implementation form of the method according to the third aspect as such or any preceding implementation form of the third aspect, the indication indicates a priority level of the data packet, the priority level being associated with the one of the first frequency and the second frequency.

In a eleventh implementation form of the method according to the third aspect as such or any preceding implementation form of the third aspect, the indication indicates a first priority level higher than a second priority level, and wherein the data packet is transmitted in the first frequency that is lower than the second frequency.

In a twelfth implementation form of the method according to the third aspect as such or any preceding implementation form of the third aspect, the indication is comprised in a header of the data packet.

A fourth aspect relates to a method for wireless communications, the method comprising instructing, by a first base station, to transmit a data packet in a first frequency of a first carrier, the first base station and a second base station configured to provide dual connectivity in the first frequency of the first carrier and a second frequency of a second carrier, and the first frequency being higher than the second frequency, wherein the data packet is from a split bearer, and instructing, by the first base station, to transmit the data packet in the second frequency upon determining that transmission of the data packet in the first frequency has failed.

The method facilitates transmission of the data packet across different frequencies, such as a high frequency (HF), e.g., a frequency above 6 GHz, and a low frequency (LF), e.g., a frequency below 6 GHz. One frequency may be used to continue transmission of the data packet in the case of transmission of the data packet in another frequency being unsuccessful. This improves communication continuity and user experience.

In a first implementation form of the method according to the fourth aspect as such, the first frequency is in a frequency band above 6 GHz, and the second frequency is in the sub-6 GHz band.

In a second implementation form of the method according to the fourth aspect as such, the first frequency and the second frequency are in a frequency band above 6 GHz.

In a third implementation form of the method according to the fourth aspect as such or any preceding implementation form of the fourth aspect, the method further comprises instructing, by the first base station, to retransmit the data packet in the first frequency before transmitting the data packet in the second frequency.

In a fourth implementation form of the method according to the fourth aspect as such or any preceding implementation form of the fourth aspect, the method further comprises determining, by the first base station, that the transmission of the data packet in the first frequency has failed upon determining that the data packet has been retransmitted in the first frequency for a predetermined number of times.

A fifth aspect relates to an apparatus, the apparatus comprising a nontransitory memory storage comprising instructions, and one or more processors in communication with the memory storage, wherein the one or more processors execute the instructions to perform a method according to any preceding implementation form of the first aspect, the second aspect, the third aspect or the fourth aspect.

A sixth aspect relates to a system, the system comprising a plurality of communication devices, wherein each communication device is configured to perform a method according to any preceding implementation form of the first aspect, the second aspect, the third aspect or the fourth aspect.

The forgoing aspects may be applied in a dual connectivity (DC) or carrier aggregation (CA) based communications system, where communications in a high frequency (HF), such as a frequency above 6 GHz, and a low frequency (LF), such as a frequency below 6 GHz, are supported. The forgoing aspects facilitate communications across the LF and the HF, while mitigating the link fragility effect in mmWave communications, and thus improve user experience in the DC or CA based communications system.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Embodiments of the present disclosure provide methods for wireless communications using both a high frequency (HF), such as frequencies in an mmWave band or frequencies above 6 GHz, and a low frequency (LF), such as frequencies below 6 GHz. The embodiments facilitate wireless communications across the HF and the LF, mitigate the link fragility effect in mmWave communications, and improve communication robustness and user experience. The embodiments may be applied in a dual connectivity (DC) or carrier aggregation (CA) based communications system, and may be implemented at a base station or a user equipment (UE).

As an illustrative example, a data packet, that is to be transmitted in a DC or CA based communications system, may include an indication to indicate whether the data packet is configured to be transmitted in a first frequency of a first carrier or a second frequency of a second carrier, and be transmitted in the first frequency or the second frequency based on the indication. As another illustrative example, a data packet in the DC or CA based communications system may also be transmitted first in a first frequency higher than a second frequency, and then be retransmitted in the second frequency upon transmission failure of the data packet in the first frequency. Further details will be provided in the following descriptions.

Figure 1:
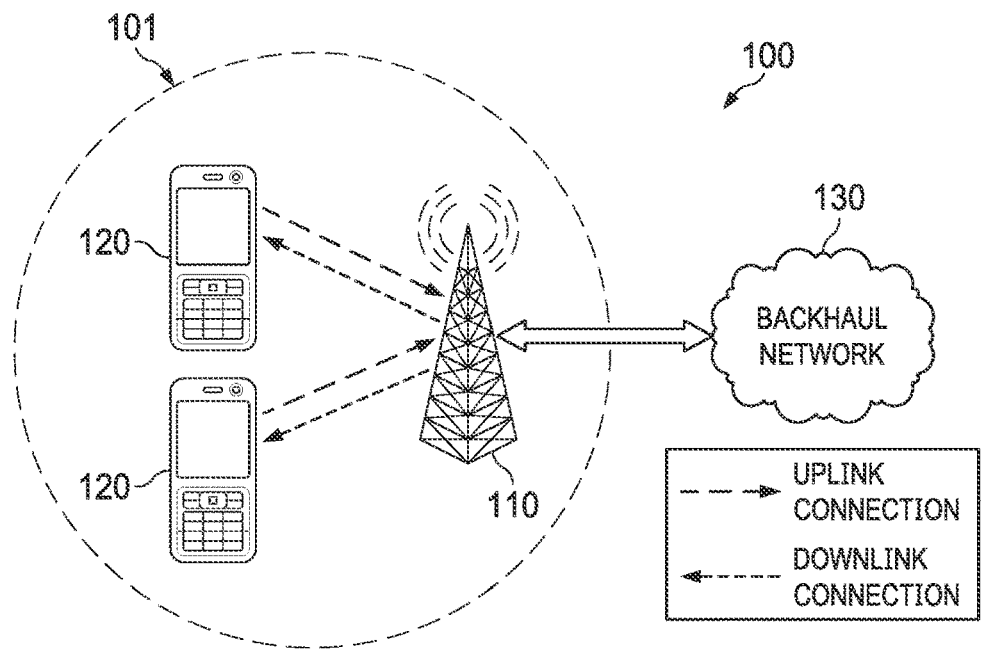
FIG. 1 illustrates a diagram of an embodiment wireless network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a next generation NodeB (gNB), a transmit/receive point (TRP), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac/ad/ax/ay, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Millimeter wave (mmWave) bands have been introduced as carrier frequencies for wireless communications, e.g., 5G new radio (NR) communications. This may help meet demand for high speed cellular data and the need for more spectra in wireless networks. Millimeter wave bands provides a large frequency bandwidth that can be used to support much higher data rate transmissions. A millimeter-wave region of the electromagnetic spectrum generally corresponds to radio band frequencies of 30 GHz to 300 GHz. In NR phase 1, according to 3GPP TS 38.101, two frequency ranges are specified, i.e., FR1 and FR2 as shown in Table 1 below.

TABLE 1

| Frequency range designation | Corresponding frequency range |
| --- | --- |
| FR1 | 450 MHz-6000 MHz |
| FR2 | 24250 MHz-52600 MHz |

Due to severe path loss in mmWave channels, beamforming is generally required in mmWave communications at both transmitter and receiver ends. Benefiting from short wave length in mmWave bands, more antennas may be integrated in UEs and base stations, and this enables employment of large scale multi-input multi-output (MIMO) in UEs and base stations, and forming of beams with high beamforming gains, which can effectively overcome the severe path loss.

As have been known, link fragility is a serious issue in mmWave communications. Due to high penetration loss, mmWave beam may be easily blocked by objects, such as buildings, cars, or human body. It is very challenging to maintain an mmWave beam pair link because of random blockage and UE movement. As a result, maintaining robust communications via mmWave links is challenging.

There have been methods proposed to improve link robustness in mmWave communications. For example, multiple mmWave links may be set up between an mmWave enabled UE and mmWave enabled transmit points (TPs), such as favorable mmWave TPs of the UE. The UE may maintain multiple mmWave links. If one link is broken, the UE may use another one. However, this approach requires establishing multiple mmWave links with multiple TPs, which increases communication cost, wastes communication resources, and complicates communication procedures.

Dual connectivity (DC) or carrier aggregation (CA) utilizing multiple component carriers, such as both a high carrier frequency and a low carrier frequency, may be used to improve service robustness over the high carrier frequency. In 3GPP Release 15, a new radio (NR) non-standalone (NSA) scheme is specified, where LTE-NR dual connectivity (DC) is supported. With LTE-NR DC, a UE may connect with a LTE base station and a NR base station simultaneously. Service robustness over the NR mmWave band may be improved by scheduling one service, e.g., video, FTP, etc., over both the mmWave band and the LTE band.

3GPP TS 37.340 V15.4.0 specifies Multi-radio access technology (RAT) dual connectivity (MR-DC) and NR-DC. The following description is provided according to 3GPP TS 37.340 V15.4.0. MR-DC is a generalization of the Intra-E-UTRA Dual Connectivity (DC), where a multiple receive (Rx)/transmit (Tx) UE may be configured to utilize resources provided by two different nodes connected via non-ideal backhaul, with one providing evolved universal terrestrial radio access (E-UTRA) and the other one providing NR access. One node acts as the master node (MN) and the other as the secondary node (SN). The MN and SN are connected via a network interface and at least the MN is connected to a core network. The core network may be an evolved packet core (EPC) or a 5G core (5GC).

Figure 2:
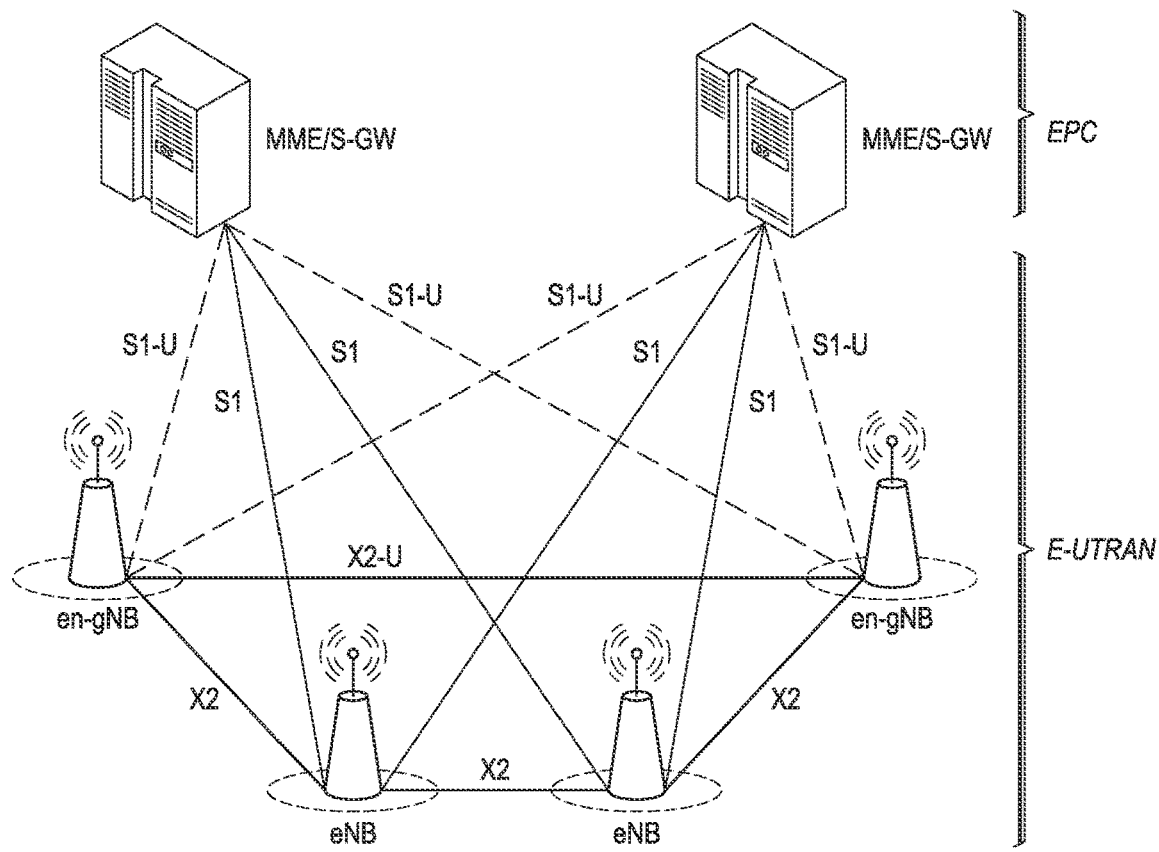
FIG. 2 illustrates a diagram of an EN-DC architecture according to 3GPP TS 37.340.

For MR-DC with the EPC, according to 3GPP TS 37.340 V15.4.0, E-UTRAN supports MR-DC via E-UTRA-NR dual connectivity (EN-DC), in which a UE is connected to one eNB that acts as a MN and one en-gNB that acts as a SN. An en-gNB is a node providing NR user plane and control plane protocol terminations towards a UE, and acting as Secondary Node in EN-DC, according to 3GPP TS 37.340 V15.4.0. The eNB is connected to the EPC via the S1 interface and to the en-gNB via the X2 interface. The en-gNB may also be connected to the EPC via the S1-U interface and connected to other en-gNBs via the X2-U interface. FIG. 2 illustrates a diagram of an EN-DC architecture as specified in 3GPP TS 37.340 V15.4.0.

Figure 3:
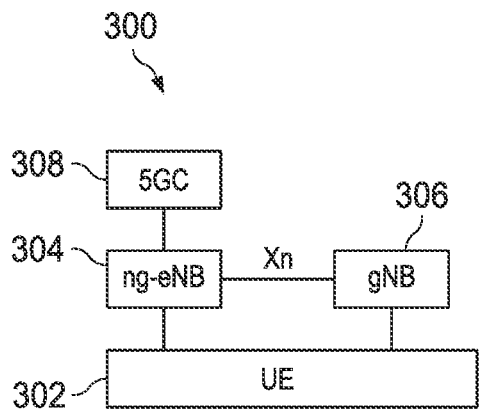
FIG. 3 illustrates a diagram of a NGEN-DC architecture according to 3GPP TS 37.340.

For MR-DC with the 5GC, a next generation (NG)-radio access network (RAN) supports NG-RAN and E-UTRA-NR Dual Connectivity (NGEN-DC), and NR-E-UTRA Dual Connectivity (NE-DC). FIG. 3 illustrates a diagram of a NGEN-DC architecture 300 as specified in 3GPP TS 37.340 V15.4.0. In the NGEN-DC architecture 300, a UE 302 is connected to a ng-eNB 304 that acts as a MN and a gNB 306 that acts as a SN. An ng-eNB is a node providing E-UTRA user plane and control plane protocol terminations towards a UE, and connected via the NG interface to the 5GC, according to 3GPP TS 38.300. The ng-eNB 304 is connected to a 5GC 308, and the gNB 306 is connected to the ng-eNB 304 via the Xn interface.

Figure 4:
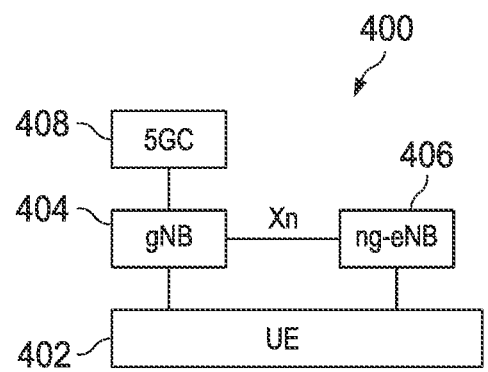
FIG. 4 illustrates a diagram of a NE-DC architecture according to 3GPP TS 37.340.

FIG. 4 illustrates a diagram of a NE-DC architecture 400 as specified in 3GPP TS 37.340 V15.4.0. In the NE-DC architecture 400, a UE 402 is connected to a gNB 404 that acts as a MN and a ng-eNB 406 that acts as a SN. The gNB 404 is connected to a 5GC 408 and the ng-eNB 406 is connected to the gNB 404 via the Xn interface.

Figure 5:
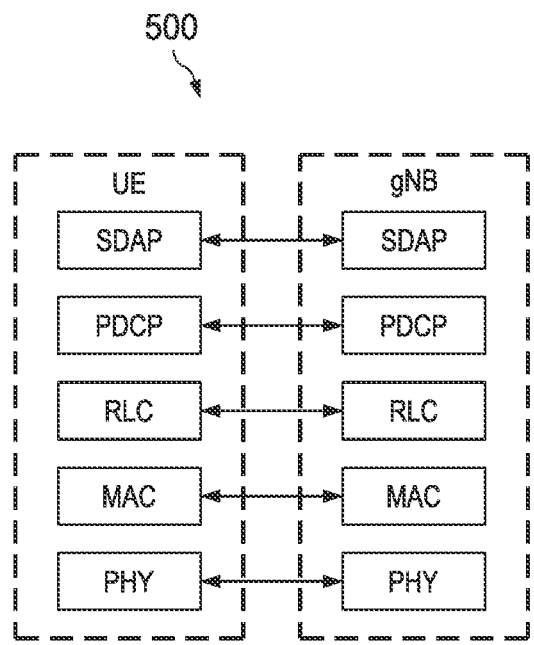
FIG. 5 illustrates a diagram of a radio protocol stack for the user plane.

FIG. 5 illustrates a diagram of a radio protocol stack 500 for the user plane in NR. FIG. 5 shows layer 2, which includes a service data adaptation protocol (SDAP) layer, a packet data convergence protocol (PDCP) layer, a radio link control (RLC) layer, a medium access control (MAC) layer and a physical (PHY) layer. A UE 502 and a gNB 504 communicate with each in the multiple layers according to different protocols.

In MR-DC, according to 3GPP TS 37.340 V15.4.0, there are three types of radio bearer specified from a UE's perspective, i.e., a master cell group (MCG) bearer, a secondary cell group (SCG) bearer and a split bearer. A radio bearer is an information transmission path of defined capacity, delay and bit error rate, etc., according to 3GPP TS 21.905. A split bearer is a radio bearer with RLC bearers both in MCG and SCG, according to 3GPP TS 37.340 V15.4.0. A MCG bearer may be referred to as a transmission path to or from a master cell. A SCG bearer may be referred to as a transmission path to or from a secondary cell.

Figure 6:
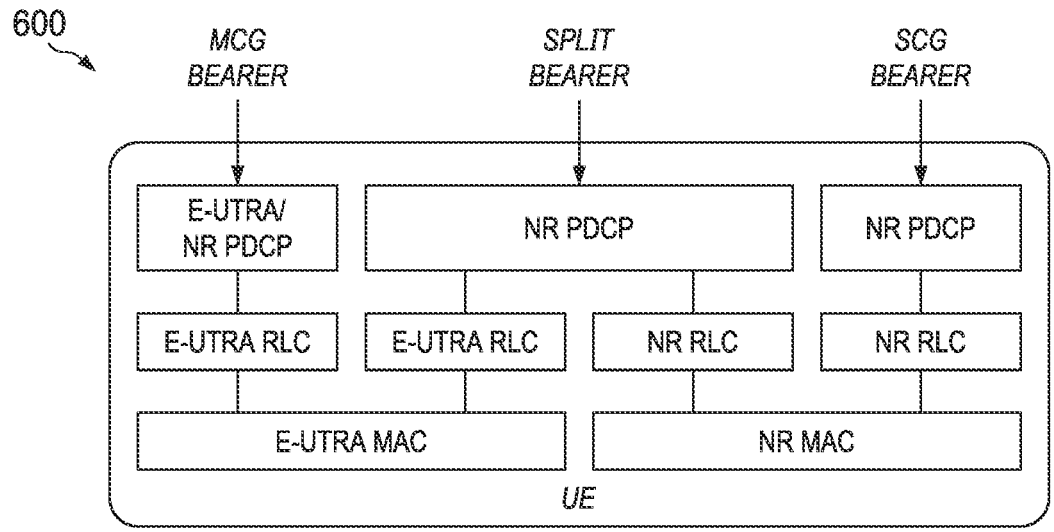
FIG. 6 illustrates a diagram of a radio protocol architecture from a UE's perspective in MR-DC with EPC.

FIG. 6 illustrates a diagram of a radio protocol architecture 600 from a UE's perspective in MR-DC with EPC, i.e., EN-DC, as specified in 3GPP TS 37.340 V15.4.0. For EN-DC, a network may configure either E-UTRA PDCP or NR PDCP for the MCG bearer, while NR PDCP is used for the SCG and split bearers.

As shown in FIG. 6, traffic data from the upper layer may be transmitted in four different paths. Traffic data mapped to the MCG bearer may be sent in a path including an E-UTRA PDCP entity, an E-UTRA RLC entity and an E-UTRA MAC entity for transmission. Traffic data mapped to the split bearer for transmission may be sent in a first path including a NR PDCP entity, an E-UTRA RLC entity, and the E-UTRA MAC entity, or sent in a second path including the NR PDCP entity, an RLC entity, and an NR MAC entity. The NR PDCP may randomly dispatch traffic data from the split bearer to the first path or the second path. Traffic data mapped to the SCG bearer may be sent in a path including an NR PDCP entity, an NR RLC entity and the NR MAC entity for transmission.

Figure 7:
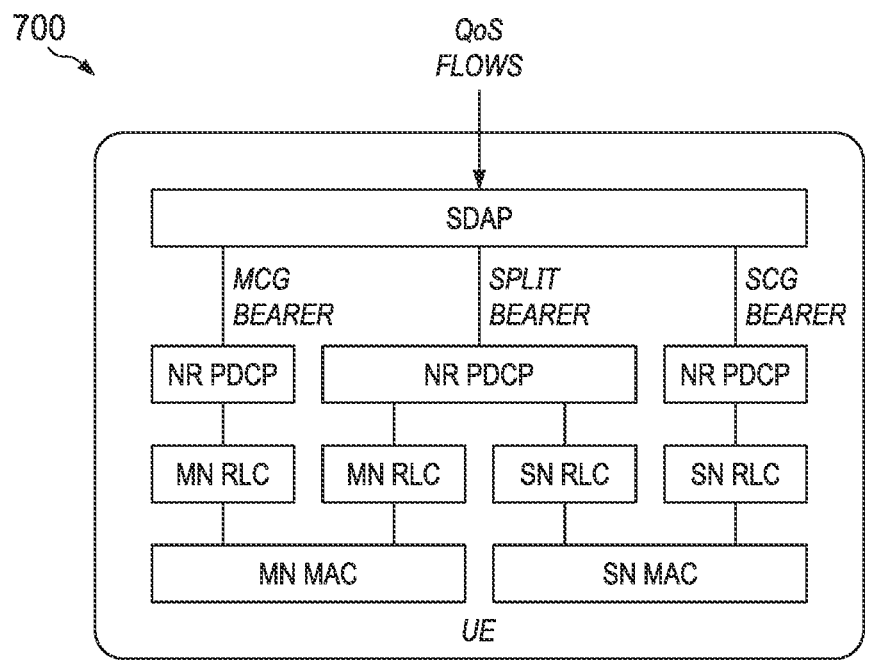
FIG. 7 illustrates a diagram of a radio protocol architecture from a UE's perspective in MR-DC with 5GC.

FIG. 7 illustrates a diagram of a radio protocol architecture 700 from a UE's perspective in MR-DC with 5GC, i.e., NGEN-DC or NE-DC, or NR-DC, as specified in 3GPP TS 37.340 V15.4.0. In MR-DC with 5GC, NR PDCP is used for all bearer types, e.g., the MCG bearer, the SCG bearer and the split bearer. In NGEN-DC, E-UTRA RLC and E-UTRA MAC are used in the MN, while NR RLC and NR MAC are used in the SN. In NE-DC, NR RLC and NR MAC are used in the MN, while E-UTRA RLC and E-UTRA MAC are used in the SN. In NR-DC, both the MN and the SN use NR RLC and NR MAC.

As shown in FIG. 7, traffic data from the upper layer may be sent by the SDAP entity in four different paths for transmission. Traffic data mapped to the MCG bearer may be sent in a path including an NR PDCP entity, an MN RLC entity and an MN MAC entity for transmission. Traffic data mapped to the split bearer for transmission may be sent in a first path including an NR PDCP entity, a MN RLC entity and the MN MAC entity, or sent in a second path including the NR PDCP entity, a SN RLC entity and an SN MAC entity. For traffic data in the split bearer, the NR PDCP may randomly dispatch the traffic data to the first path or the second path. Traffic data mapped to the SCG bearer may be sent in a path including an NR PDCP entity, a SN RLC entity and the SN MAC entity for transmission.

Figure 8:
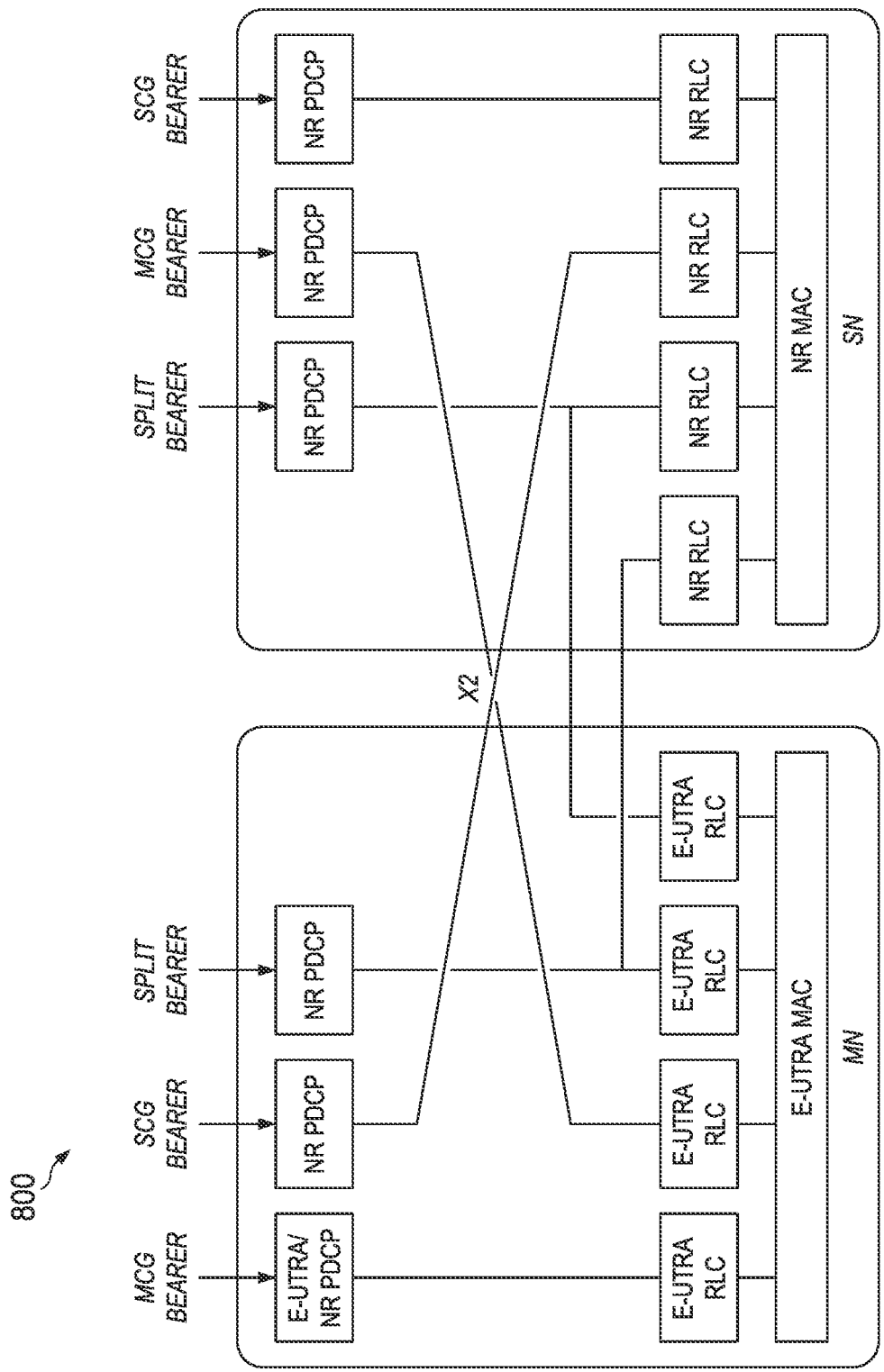
FIG. 8 illustrates a diagram of network side protocol termination options for MCG, SCG and split bearers in MR-DC with EPC.

According to 3GPP TS 37.340 V15.4.0, from a network perspective, each bearer (i.e., the MCG, SCG and split bearer) may be terminated either in a MN or in a SN. FIG. 8 illustrates a diagram 800 of the network side protocol termination options for MCG, SCC and split bearers in MR-DC with EPC (EN-DC), as specified in 3GPP TS 37.340 V15.4.0. As shown, the MN may configure E-UTRA PDCP for MCG bearers, and NR PDCP is used for SCG and split bearers. Traffic data in the MN mapped to the SCG bearer is sent to the SN for transmission. Traffic data in the MN mapped to the split bearer may be transmitted by the MN (passing through the E-UTRA RLC entity and the E-UTRA MAC entity of the MN), or transmitted by the SN (passing through the NR RLC entity and the NR MAC entity of the SN). The SN configures NR PDCP for all bearers. Traffic data, in the SN mapped to the split bearer, may be transmitted by the MN (passing through the E-UTRA RLC entity and the E-UTRA MAC entity of the MN), or transmitted by the SN (passing through the NR RLC entity and the NR MAC entity of the SN).

Figure 9:
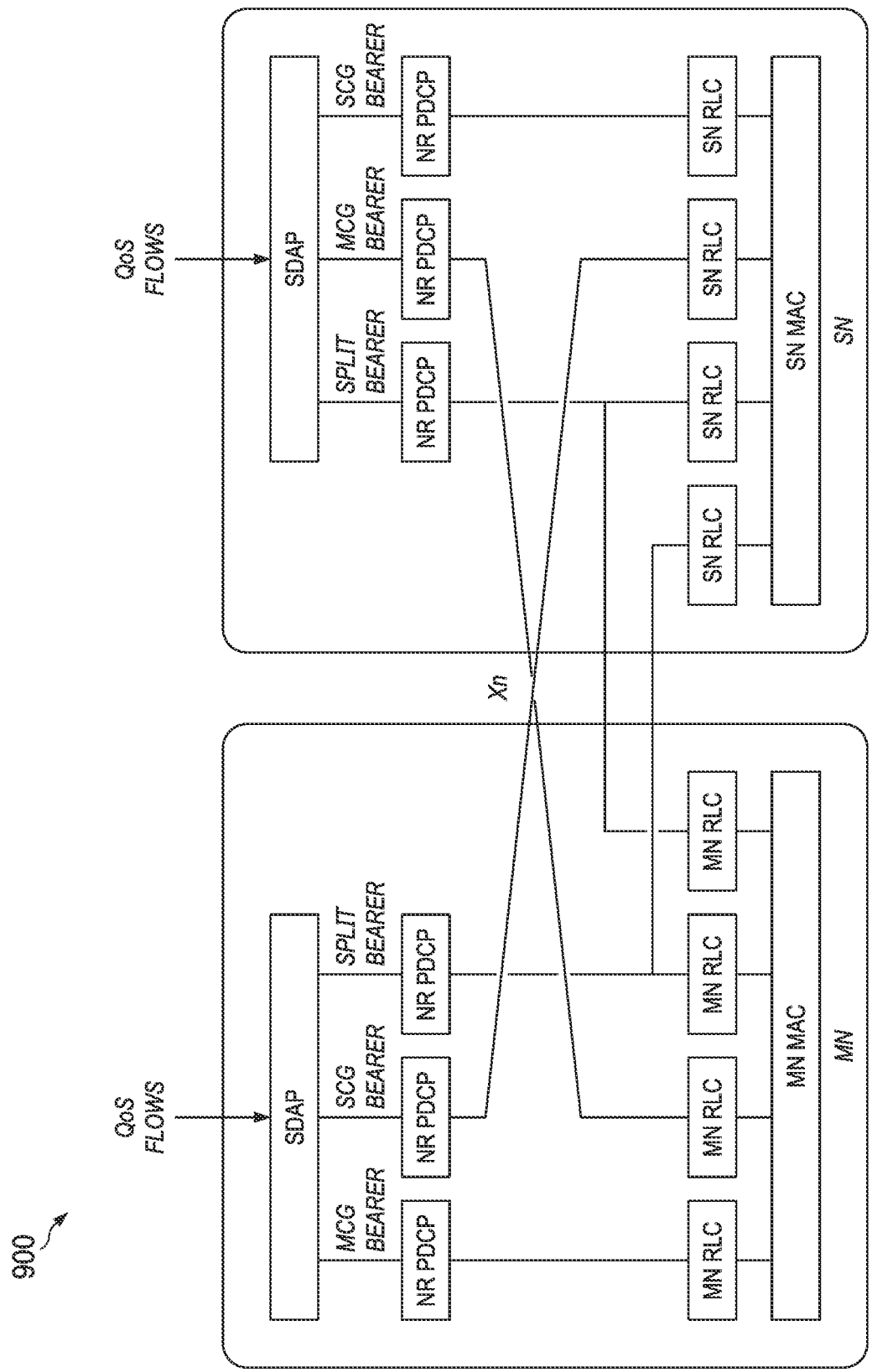
FIG. 9 illustrates a diagram of network side protocol termination options for MCG, SCG and split bearers in MR-DC with 5GC.

FIG. 9 illustrates a diagram 900 of the network side protocol termination options for MCG, SCG and split bearers in MR-DC with 5GC (NGEN-DC, NE-DC or NR-DC), as specified in 3GPP TS 37.340 V15.4.0. NR PDCP is used for all bearers in the MN and the SN. QoS flows in the MN mapped to the SCG bearer is sent to the SN for transmission (through SN RLC and SN MAC). QoS flows in the SN mapped to the MCG bearer is sent to the MN for transmission (through MN RLC and MN MAC). QoS flows mapped to the split bearer, either in the MN or the SN, will be split into two portions, with one portion being transmitted by the MN, and the other being transmitted by the SN.

Figure 10:
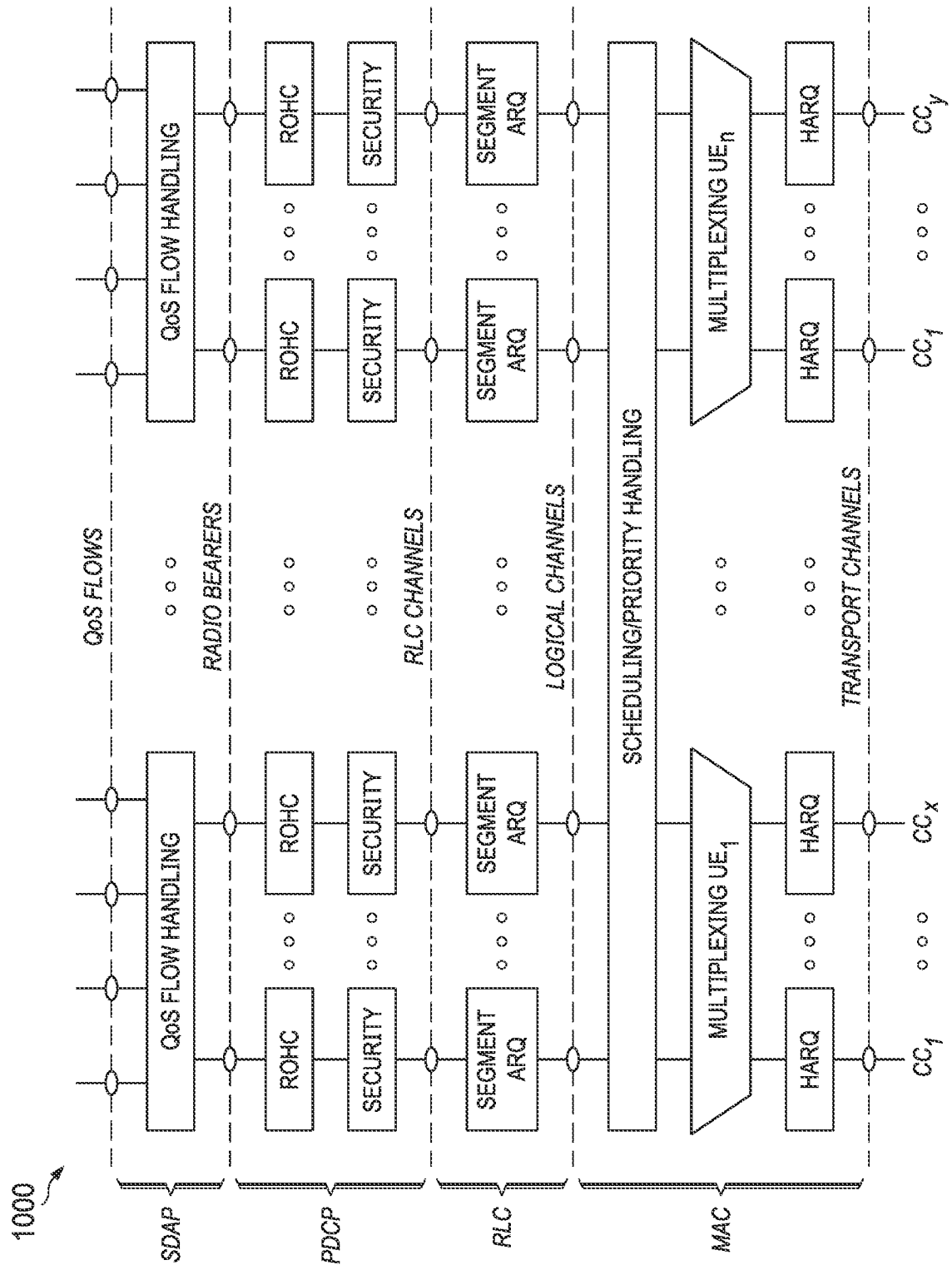
FIG. 10 illustrates a diagram of a layer 2 structure for downlink transmission with CA configured.

According to 3GPP TS 38.300, in NR carrier aggregation (CA), two or more component carriers (CCs) may be aggregated for communication. The following description about NR CA is provided according to 3GPP TS 38.300. A UE may simultaneously receive or transmit on one or multiple CCs depending on its capabilities. FIG. 10 illustrates a diagram 1000 of a layer 2 structure for downlink with CA configured, as specified in 3GPP TS 38.300. In CA, traffic data from different data radio bearers (DRBs) are multiplexed in MAC layer and allocated to multiple component carriers. As shown, multiple quality of service (QoS) flows are handled in the SDAP layer, and sent to the PDCP layer, the RLC layer, and then the MAC layer. In the MAC layer, QoS flows for each UE are multiplexed and transmitted in different CCs. Although different subsets of QoS flows are mapped to different radio bearers, this doesn't guarantee that high priority data is transmitted in a LF carrier and low priority data is transmitted in mmWave band carrier due to the data multiplexing in MAC layer.

NR has introduced packet duplication in layer 2. According to 3GPP TS 38.300, when duplication is configured for a radio bearer by radio resource control (RRC), an additional RLC entity and an additional logical channel are added to the radio bearer to handle the duplicated PDCP PDUs. Duplication at PDCP therefore consists in sending the same PDCP PDUs twice: once on the original RLC entity and a second time on the additional RLC entity. With two independent transmission paths, packet duplication therefore increases reliability and reduces latency, and is especially beneficial for URLLC services. When duplication occurs, the original PDCP PDU and the corresponding duplicate shall not be transmitted on the same carrier. The two different logical channels can either belong to the same MAC entity (i.e., in case of CA) or to different ones (i.e., in case of DC). In the former case, logical channel mapping restrictions are used in MAC to ensure that the logical channel carrying the original PDCP PDUs, and logical channel carrying the corresponding duplicates are not sent on the same carrier. Once configured, duplication may be activated and de-activated per DRB by means of a MAC control element. In CA, when duplication is de-activated, the logical channel mapping restrictions are lifted. In DC, a UE applies MAC CE commands regardless of their origin (MCG or SCG). For SRBs, duplication is solely controlled by RRC.

Figure 11A:
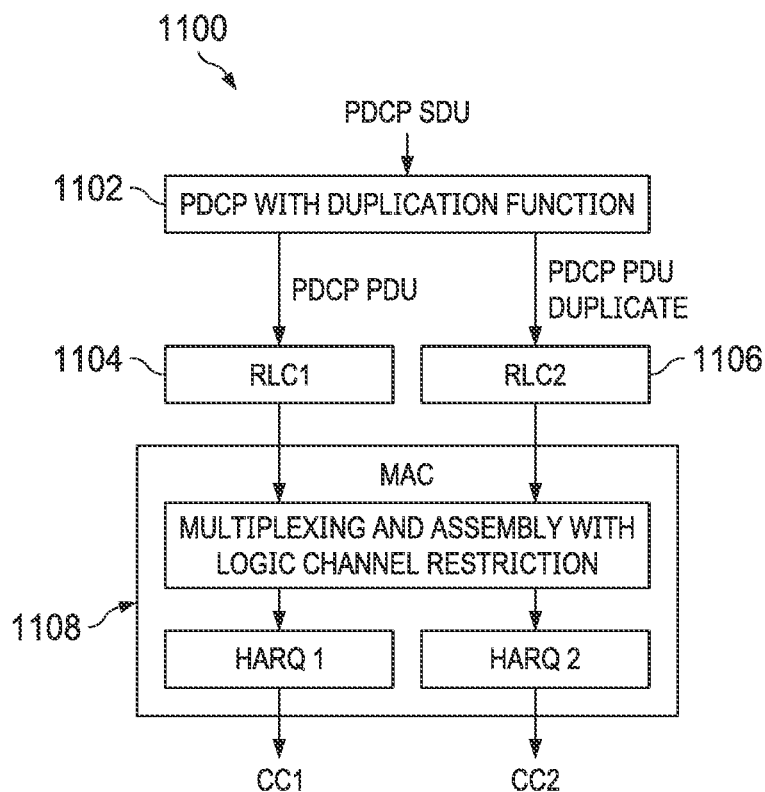
FIG. 11A illustrates a diagram showing packet duplication in NR CA.

FIG. 11a illustrates a diagram 1100 showing packet duplication in NR-CA. As shown, a PDCP service data unit (SDU) is sent to a PDCP entity 1102 with duplication function. Two paths are established. A first path for transmitting the PDCP SDU (i.e., the original PDCP SDU) includes the PDCP entity 1102, a RLC entity, i.e., RLC1 1104 and a MAC entity 1108. A second path for transmitting a duplicate of the PDCP SDU (the PDP SDU duplicate) includes the PDCP entity 1102, a RLC entity, i.e., RLC2 1106 and the MAC entity 1108. The PDCP entity 1102 generates a PDCP protocol data unit (PDU) corresponding to the original PDCP SDU, and generates a PDCP PDU duplicate, and sends the generated PDCP PDU and duplicate to the RLC1 1104 and RLC2 1106, respectively. The PDCP PDU is sent to the RLC1 1104, and the PDCP PDU duplicate is sent to the RLC2 1106. The RLC1 1104 and the RLC2 1106 then generate and send respective RLC PDUs to the MAC entity 1108. In the MAC layer, according to the logic channel mapping restriction, RLC PDUs generated by the RLC1 1104 and the RLC2 1106 are multiplexed separately, and sent to different hybrid automatic repeat request (HARQ) entities, i.e., HARQ 1 and HARQ 2, respectively. The original PDCP PDU and the PDCP PDU duplicate are then transmitted on different carriers CC1 and CC2, respectively.

Figure 11B:
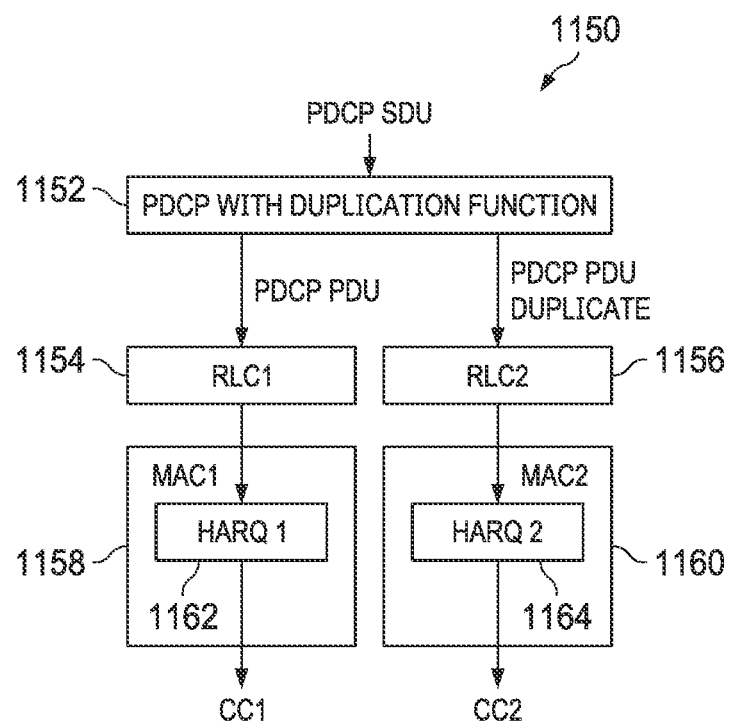
FIG. 11B illustrates a diagram showing packet duplication in NR DC or MRDC.

FIG. 11B illustrates a diagram 1500 showing packet duplication in NR-DC or MR-DC. As shown, a PDCP service data unit (SDU) is sent to a PDCP entity 1152. The PDCP entity 1152 is configured to have the duplication function. When duplication is configured for a radio bearer associated with the PDCP SDU, an additional RLC entity is added to the radio bearer to handle duplicated PDCP PDUs. Two paths are established. A first path for transmitting the PDCP SDU (i.e., the original PDCP SDU) includes the PDCP entity 1152, a RLC entity 1154, i.e., RLC1, and a MAC entity 1158, i.e., MAC1. A second path for transmitting a duplicate of the PDCP SDLU (the PDP SDU duplicate) includes the PDCP entity 1152, a RLC entity 1156, i.e., RLC2 and a MAC entity 1158, i.e., MAC2. The PDCP entity 1152 generates a PDCP protocol data unit (PDU) corresponding to the original PDCP SDU, and generates a PDCP PDU duplicate, and sends the generated PDCP PDU and duplicate to the RLC1 1154 and RLC2 1156, respectively. The PDCP PDU is sent to the RLC1 1154, and the PDCP PDU duplicate is sent to the RLC2 1156. The RLC1 1154 and the RLC2 1156 then generate and send respective RLC PDUs to the MAC entity 1158 and 1110, respectively. In the MAC layer, MAC1 and MAC2 send data to their respective hybrid automatic repeat request (HARQ) entities, i.e., HARQ 1 1112 and HARQ 2 1114, respectively. The original PDCP PDU and the PDCP PDU duplicate are then transmitted on different carriers CC1 and CC2, respectively. In a case that the transmitting device (for transmitting the PDCP PDU) is a base station, this PDCP entity 1152 can be in a MN or a SN. Corresponding to different DC scheme, e.g., MR-DC (EN-DC, NGEN-DC and NE-DC) or NR-DC, the first path may be in the MN while the second path in the SN, or the first path in the SN while the second path in the MN.

DC or CA utilizing different component carriers, such as both a high carrier frequency and a low carrier frequency, may be used to improve service robustness over the high carrier frequency. In the current DC scheme, e.g., as described above with FIGS. 6-9, data from a split bearer may be transmitted by a MN or a SN. That is, data from a split bearer may be transmitted in different frequencies, e.g., a LF and a HF, such as frequencies in LTE bands or in mmWave bands. In the current CA scheme, as described in FIGS. 11-12, QoS flows may be transmitted in different CCs, e.g., LFs and HFs. It would be desirable to provide mechanisms to mitigate the link fragility effect in mmWave communications and improve user experience based on the current DC or CA scheme.

Embodiments of the present disclosure provide methods and apparatuses that may tightly integrate communications in both LF and HF (e.g., mmWave), and enable data transmission across LF and HF, with swift switching back and forth between LF and mmWave band. The embodiments provide mitigation of the link fragility effect in mmWave communications and improve user experience based on the current DC or CA scheme. As used herein, a LF or a HF may be generally referred to a frequency that is relatively lower or higher than another frequency. For example, in a system supporting communications using both LTE and NR frequency bands, a LF may be referred to as a frequency in the LTE frequency bands or NR sub-6 GHz frequency bands (i.e., below 6 GHz), and a HF may be referred to as a frequency in the 5G mmWave frequency bands, e.g., an mmWave band. In another example, a LF may be in a frequency band below 6 GHz, and a HF may be in a frequency band above 6 GHz. In another example, in a system supporting DC or CA, a first carrier frequency lower than a second carrier frequency is a LF, and the second carrier is a HF. In the following embodiments, an mmWave band or HF band may generally refer to a frequency band above 6 GHz, and a sub-6 GHz band refers to a frequency band below 6 GHz.

Specifically, the embodiments provide two schemes based on DC or CA, i.e., a parallel scheme and a retransmission scheme. Generally, in the parallel scheme, user plane traffic is divided into two subsets. One subset is transmitted in a LF band, and the other one is transmitted in a HF band, e.g., an mmWave band. In the retransmission scheme, user plane traffic may initially be transmitted in a HF band, e.g., an mmWave band, and then retransmitted, if needed, in a LF band.

Parallel Scheme

According to some embodiments in the parallel scheme, data to be transmitted may include an indication that indicates whether the data is to be transmitted in a LF or a HF. The data is then transmitted according to the indication. An indication herein may include any control information or signal, e.g., a flag bit or a field, that directly or indirectly indicates whether the data is to be transmitted in a LF or a HF. In one example, the indication of a data packet may be a label assigned to the data packet, and the data packet is determined to be transmitted in either a LF band or a HF band according to the label. The label may indicate a priority level assigned to data. Two priority levels, i.e., a first priority level, and a second priority level lower than the first priority level, may be assigned, and data with different priority levels may be transmitted in a LF or a HF, respectively. In order to provide a more robust data transmission service, while making use of mmWave band advantages, data with the first priority level (i.e., high priority) may be directed to be transmitted in a LF band (e.g., for maintaining service continuity), and data with the second priority level (i.e., low priority) may be directed to be transmitted in a HF band, e.g., an mmWave band. In this case, the high priority level is associated with the LF, and the low priority level is associated with the HF.

A typical use case for the parallel scheme is the video service. For video data, layered source code may be used to support heterogeneous users, where different users have different requirements for video qualities, or to support graceful degradation, where some less important parts of a bit stream are not delivered, received or decoded (e.g., lost, discarded). In some embodiments, video data may be encoded into two layers, i.e., layer 0 and layer 1. Layer 0 data may provide a basic standard video. That is, layer 0 provides data for maintaining the video service. Layer 1 may provide additional data to support high definition video for providing better quality of the video. In a case that a robust video service is more desirous, layer 0 data may be assigned a high priority and layer 1 data may be assigned a low priority. Layer 0 data may be transmitted in a LTE (LF) band to maintain the video service continuity, while layer 1 data may be transmitted in an mmWave band for providing better quality of the video. If radio link failure happens in the mmWave band, a network node may reschedule layer 1 data to the LTE LF band. If the radio link is recovered in the mmWave band, the network may schedule the layer 1 data back to the mmWave band again.

In the following embodiments, the layered video data described above will be used as an example use case for illustrative purposes. However, those or ordinary skill in the art would recognize that the embodiments may be applicable to various use cases, where data in communications may be divided into two subsets (e.g., layers), which may be sent in a LF band and a HF band, respectively.

Figure 12:
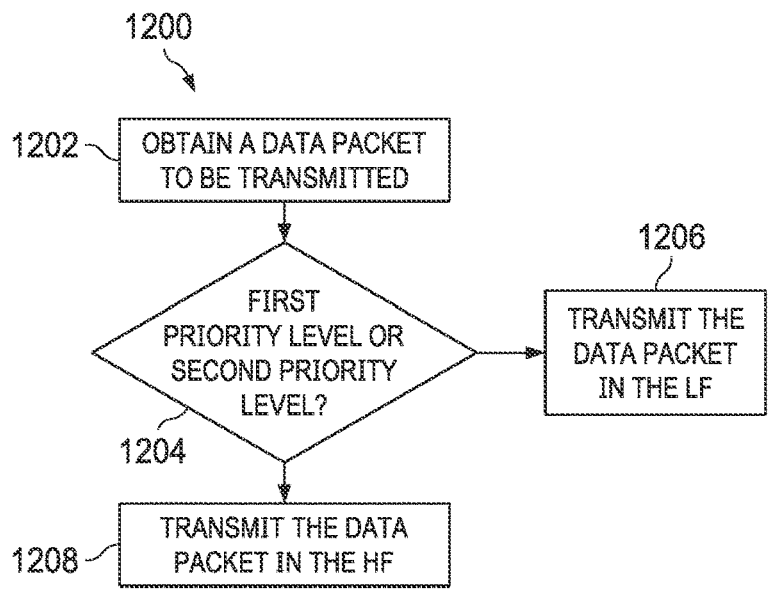
FIG. 12 illustrates a flowchart of an embodiment method for wireless communications.

FIG. 12 illustrates a flowchart of an embodiment method 1200 for wireless communications. The method 1200 may be performed by a communication device, such as a UE, that supports communication in multiple CCs, i.e., a LF and a HF, such as in MR-DC or NR-DC. As shown, at step 1202, the UE obtains a data packet to be transmitted. The data packet includes an indication indicating a priority level of the data packet. The priority level may be a first priority level, or a second priority level that is less than the first priority level. The first priority level is associated with the LF, indicating that the data packet is to be transmitted in the LF. The second priority level is associated with the HF, indicating that the data packet is to be transmitted in the HF. At step 1204, the UE determines, based on the indication, whether the data packet has the first priority level (to be directed for transmission in the LF) or the second priority level (to be directed for transmission in the HF). Based on the determination made at step 1204, the UE either transmits the data packet in the LF at step 1206, or transmits the data packet in the HF at step 1208.

In a case that the UE supports MR-DC, because only traffic data in the split bearer may be directed to different paths for transmission, as discussed above with respect to the FIG. 6 or FIG. 7, the data packet should be mapped to the split bearer in the upper layer, and which path the data packet should be directed to is determined based on the indication of the data packet.

In some embodiments with respect to FIG. 12, when the UE supports MR-DC with EPC, i.e., EN-DC, an NR PDCP entity of the UE may obtain the data packet in the split bearer from the upper (or higher) layer. The indication of the data packet indicates a priority level associated with the LF or the HF, and thus indicates which RLC entity, i.e., the E-UTRA RLC entity, or the NR RLC entity, that the NR PDCP entity should direct the data packet to. Taking the layered video data service as an example, where layered source coding is used for video data, a video data packet may be labelled in the higher layer to indicate whether it is layer 0 data or layer 1 data. Then, the video data packet is mapped to the split bearer, and sent to the NR PDCP entity. The NR PDCP entity directs layer 0 data to the EUTRA RLC entity (LF), and directs layer 1 data to the NR RLC entity (HF).

NR specification specifies a condition to restrict a transmitter, such as a UE or a base station, in dispatching traffic to additional paths. According to the 3GPP TS 38.323

V15.4.0, section 5.2.1, in transmit operation, when submitting a PDCP PDU to lower layer, the transmitting PDCP entity shall:
    if the transmitting PDCP entity is associated with one RLC entity:
    submit the PDCP PDU to the associated RLC entity;
    else, if the transmitting PDCP entity is associated with two RLC entities:
    if the PDCP duplication is activated:
    if the PDCP PDU is a PDCP Data PDU:
    duplicate the PDCP Data PDU and submit the PDCP Data PDU to both associated RLC entities;
    else:
    submit the PDCP Control PDU to the primary RLC entity;
    else:
    if the two associated RLC entities belong to the different Cell Groups; and
    if the total amount of PDCP data volume and RLC data volume pending for initial transmission in the two associated RLC entities is equal to or larger than ul-DataSplitThreshold:
    submit the PDCP PDU to either the primary RLC entity or the secondary RLC entity;
    else:
    submit the PDCP PDU to the primary RLC entity.

According to the specification as described above, in case of packet duplication deactivated, only when traffic data volume is over a pre-set threshold "ul-DataSplitThreshold", a transmitter, such as a UE or a network node (e.g., a base station) can dispatch the traffic data to an additional path, and how traffic is allocated to two paths is determined by the UE or a network node itself. To enable the embodiment parallel scheme in uplink transmission for the EN-DC case, e.g., data may be directed to different paths based on an indication of the data, such a condition (and the threshold) needs to be disabled or removed. Thus, a UE may dispatch traffic data to different paths without need to satisfy the condition. For example, a UE, when triggered by an application, e.g., a video streaming service, or based on a high layer indication indicating the parallel mode is enabled, may dispatch traffic in the split bearer to the two paths configured for the split bearer, and path selection is based on the label or indication embedded in the traffic.

In some embodiments with respect to FIG. 12, when the UE support MR-DC with 5GC, i.e., NGEN-DC, or NE-DC, or NR-DC, an NR PDCP entity of the UE may obtain QoS flows in a PDU session mapped to the split bearer from the upper (or higher) layer, e.g., the SDAP entity. The NR PDCP entity may direct a subset of the QoS flows of the PDU session to an MN (or a SN), and direct the rest of the QoS flows to an SN (or a MN), based on the carrier frequencies of the MN and the SN and indications of data packets in the QoS flows. In this example, data packets with the same priority level may be mapped into one QoS flow, and the QoS flow is transmitted in the LF or the HF associated with the priority level. In the MR-DC with 5GC, an MN may be configured to operate at a carrier frequency higher or lower than an SN. Thus, the NR PDCP entity may direct a QoS flow having a high priority to the MN RLC entity or the SN RLC entity depending whether the MN or the SN operates at the LF. When the MN operates at the LF and the SN operates at the HF, a QoS flow with a high priority will be directed to the MN RLC entity, and a QoS flow with a low priority will be directed to the SN RLC entity. When the MN operates at the HF and the SN operates at the LF, a QoS flow with a high priority will be directed to the SN RLC entity, and a QoS flow with a low priority will be directed to the MN RLC entity. Taking the layered video data service as an example, where layered source coding is used for video data, layer 0 data may be mapped to a first QoS flow, and layer 1 data may be mapped to a second QoS flow. When the MN's carrier frequency is lower than the SN's, the first QoS flow may be directed to the MN, and the second QoS flow may be directed to the SN. When the MN's carrier frequency is higher than the SN's, the first QoS flow may be directed to the SN, and the second QoS flow may be directed to the MN.

Figure 13:
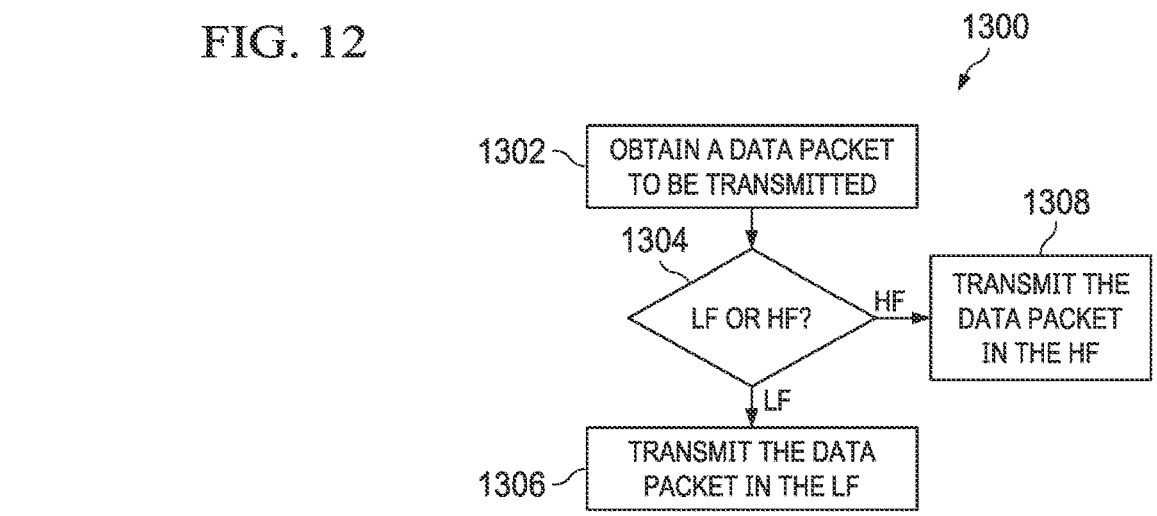
FIG. 13 illustrates a flowchart of another embodiment method for wireless communications.

FIG. 13 illustrates a flowchart of an embodiment method 1300 for wireless communications. The method 1300 may be performed by a communication device, such as a UE, that supports communication in multiple CCs, i.e., a LF and a HF, such as in MR-DC or NR-DC. As shown, at step 1302, the UE obtains a data packet to be transmitted. The data packet includes an indication indicating whether the data packet is to be transmitted in the LF or the HF. At step 1304, the UE determines, based on the indication, whether the data packet is to be directed for transmission in the LF or the HF. Based on the determination made at step 1304, the UE either transmits the data packet in the LF at step 1306, or transmits the data packet in the HF at step 1308.

As discussed above, NR specification, i.e., 3GPP TS 38.323 V15.4.0, section 5.2.1, specifies a condition, where, for example, only when packet duplication is not configured or deactivated and traffic data volume is over a pre-set threshold, a UE can, in uplink transmission, dispatch the traffic data to an additional path, and how traffic is allocated to two paths is determined by the UE itself. To enable the parallel scheme for the case of MR-DC with 5GC, e.g., data may be directed to different paths based on an indication of the data, such a condition (and the threshold) needs to be disabled or removed. For example, a UE, when triggered by an application, e.g., a video streaming service, or based on a high layer indication indicating that the condition is disable, may dispatch traffic in the split bearer to the two paths configured for the split bearer, and path selection is based on the label or indication embedded in the traffic. The same procedure can be applied to downlink transmission.

Figure 14:
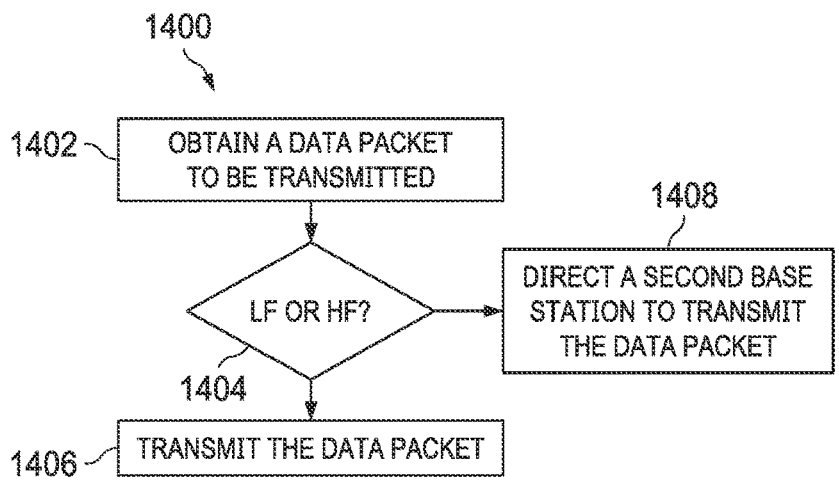
FIG. 14 illustrates a flowchart of another embodiment method for wireless communications.

FIG. 14 illustrates a flowchart of an embodiment method 1400 for wireless communication. The method 1400 may be performed by a first network node, such as a first base station in a communication system supporting DC, such as MR-DC or NR-DC. The first base station and a second base station are configured to operate together to provide communication services with MR-DC or NR-DC. The first base station may bean MN (where the second base station is an SN) or an SN (where the second base station is an MN). The first base station may be an eNB, an en-gNB, a gNB, or an ng-eNB. One of the first base station and the second base station is configured to operate at the LF, and the other one is configured to operate at the HF. As shown, at step 1402, the first base station obtains a data packet to be transmitted. In one example, the data packet may include an indication indicating a priority level of the data packet. The priority level may be a first priority level, or a second priority level that is lower than the first priority level. The first priority level is associated with the LF, indicating that the data packet is to be transmitted in the LF. The second priority level is associated with the HF, indicating that the data packet is to be transmitted in the HF. The first priority level (or the second priority level) may thus be associated with the first base station or the second base station based on whether the first base station or the second base station is operating at the LF (or the HF). At step 1404, the first base station determines, based on the indication (i.e., the priority level), whether the data packet is be directed for transmission in the LF or the HF. Based on the determination made at step 1404, the first base station determines to transmit the data packet by the first base station at step 1406, or instructs the second base station to transmit the data packet at step 1408. When the data packet has a high priority, and the first base station operates at the LF, the first base station performs step 1406. When the data packet has a high priority, and the first base station operates at the HF, the first base station performs step 1408. When the data packet has a low priority, and the first base station operates at the LF, the first base station performs step 1408. When the data packet has a low priority, and the first base station operates at the HF, the first base station performs step 1406.

In the case of MR-DC with EPC and the first base station is an MN (operating at the LF), referring back to FIG. 8, an NR PDCP of the MN obtains a data packet in the split bearer from the higher layer, and dispatches the data packet to an E-UTRA RLC entity of the MN or an NR-RLC entity of a SN based on an indication embedded in the data packet. Taking the layered video data as an example, the layer 0 data that has an indication indicating a high priority level. The layer 1 data that has an indication indicating a low priority level. When receiving the layer 0 data, the MN transmits the layer 0 data. When receiving the layer 1 data, the MN may communicate with the SN, and instruct the SN to transmit the layer 1 data.

In the case of MR-DC with EPC and the first base station is an SN (i.e., HF), an NR PDCP of the SN obtains a data packet in the split bearer from the higher layer, and dispatches the data packet to an E-UTRA RLC entity of an MN or an NR RLC entity of the SN based on an indication embedded in the data packet. Taking the layered video data as an example, the layer 0 data that has an indication indicating a high priority level. The layer 1 data that has an indication indicating a low priority level. When receiving the layer 0 data, the SN may communicate with the MN, and instruct the MN to transmit the layer 0 data. When receiving the layer 1 data, the SN transmits the layer 1 data.

In the case of MR-DC with 5GC and the first base station is an MN, referring back to FIG. 9, an NR PDCP of the MN obtains a data packet in the split bearer from the higher layer, and dispatches the data packet to an MN RLC entity of the MN or an SN RLC entity of a SN based on an indication embedded in the data packet. When the indication indicates a high priority and the MN operates at the LF, the MN transmits the data packet by itself. When the indication indicates a high priority, and the MN operates at the LF, the MN directs the data packet to the SN for transmission. When the indication indicates a low priority and the MN operates at the HF, the MN transmits the data packet by itself. When the indication indicates a low priority, and the MN operates at the LF, the MN directs the data packet to the SN for transmission. Taking the layered video data as an example, in the case of the NGEN-DC, layer 0 data that has an indication indicating the high priority may be sent to the MN RLC entity and transmitted by the MN (LF). The layer 1 data that has an indication indicating the low priority may be sent to the SN RLC entity of the SN and transmitted by the SN (mmWave). In the case of the NE-DC, layer 0 data may be sent to the SN RLC entity and transmitted by the SN (LF), and layer 1 data may be sent to the MN RLC entity and transmitted by the MN (mmWave).

Similarly, in the case of MR-DC with 5GC and the first base station is an SN, an NR PDCP of the SN obtains a data packet in the split bearer from the higher layer, and dispatches the data packet to an MN RLC entity of an MN or an SN RLC entity of the SN based on an indication embedded in the data packet.

When the indication indicates a high priority and the SN operates at the LF, the SN transmits the data packet by itself. When the indication indicates a high priority, and the SN operates at the HF, the SN directs the data packet to the MN for transmission. When the indication indicates a low priority and the SN operates at the HF, the SN transmits the data packet by itself. When the indication indicates a low priority, and the SN operates at the LF, the SN directs the data packet to the MN for transmission. Taking the layered video data as an example, in the case of the NGEN-DC, layer 0 data that has an indication indicating the high priority may be sent to the MN RLC entity and transmitted by the MN (LF). The layer 1 data that has an indication indicating the low priority may be sent to the SN RLC entity of the SN and transmitted by the SN (HF). In the case of the NE-DC, layer 0 data may be sent to the SN RLC entity and transmitted by the SN (LF), and layer 1 data may be sent to the MN RLC entity and transmitted by the MN (HF).

A data packet in the split bearer may include a field specifically containing an indication indicating a priority level of the data packet, based on which the data packet is directed to different paths, and transmitted in a LF or a HF. For example, a 1-bit field may be used (if available) or added (i.e., a new field) in the data packet, indicating a priority level of the data packet. The priority level may be a first priority level (high priority) or a second priority level (low priority). Taking as an example an IP packet conveyed in a DRB, the header of the IP packet may include a 1-bit field containing the indication. For example, "0" may indicate that the IP packet has the first priority, and "1" may indicate that the IP packet has the second priority, or vice versa.

Figure 15:
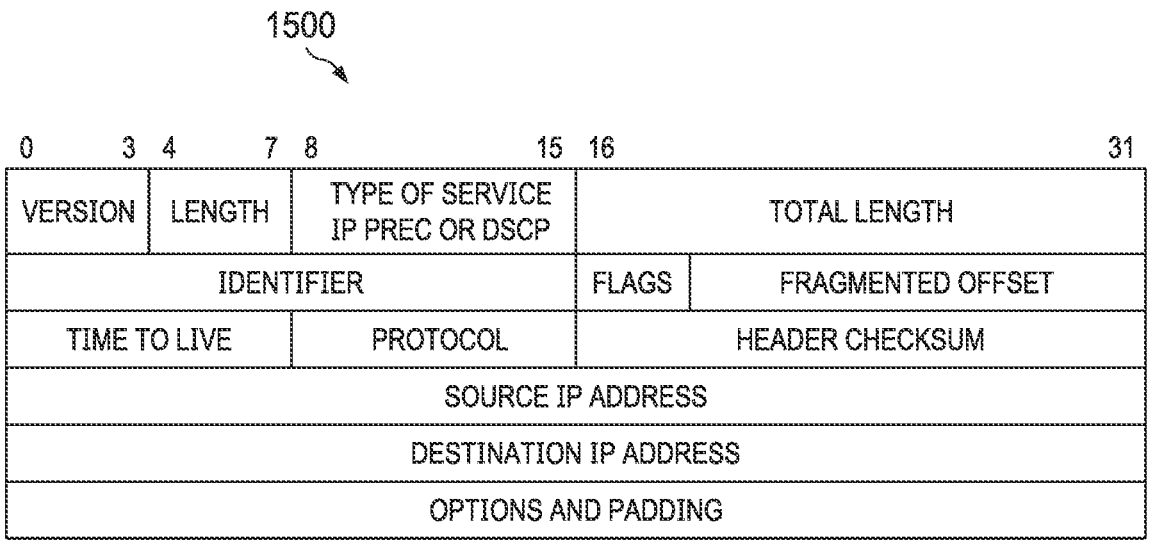
FIG. 15 illustrates a diagram of a header format of an IPv4 packet.
Figure 16:
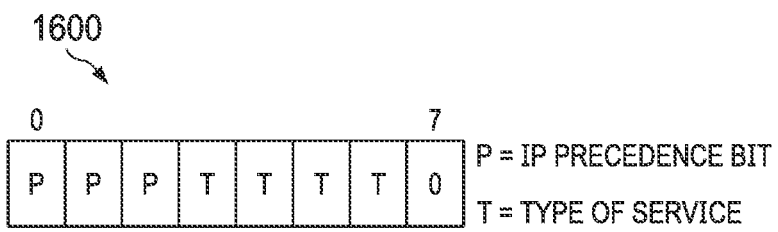
FIG. 16 illustrates a diagram of a type of service field in an IPv4 packet header.
Figure 17:
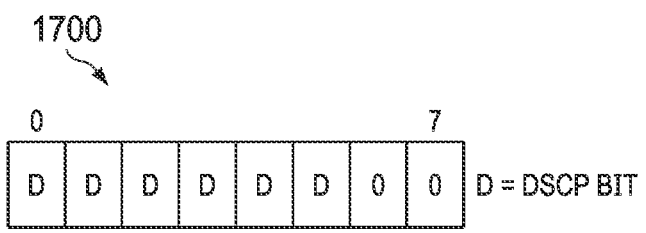
FIG. 17 illustrates a diagram of a DSCP field in an IPv4 packet header.

FIG. 15 illustrates a diagram of a header format 1500 of an IPv4 packet. As shown, the IPv4 packet header includes fields of version, length, type of service IP precedence (also known as differentiated services code point (DSCP)), total length, identifier, flags, fragmented offset, time to live, protocol header checksum, source IP address, destination IP address, and options and padding. In one embodiment, the last bit that is not used in the type of service (or DSCP) field may be used for the indication to indicate the priority level of the IP packet. FIG. 16 illustrates a diagram 1600 of the type of service field in the IPv4 packet header of FIG. 15. In FIG. 16, "P" represents an IP precedence bit, and "T" represents a type of service bit. The last bit, i.e., bit 7, may be used to indicate the priority level of the IP packet. FIG. 17 illustrates a diagram 1700 of the DSCP field in the IPv4 packet header of FIG. 15. In FIG. 17, "D" represents a DSCP bit. The last bit, i.e., bit 7, may be used to indicate the priority level of the IP packet. In another embodiment, a 1-bit indication may be added in the field of options and padding to indicate the priority level of the IP packet. Those of ordinary skill in the art would recognize that various methods may be used to include an indication in a data packet or a data for indicating a priority level in two different priority levels of the data packet or data.

In some embodiments, in the case of MR-DC or NR-DC, the user plane traffic of different priority levels may not need to be mapped to the split bearer and may not need to include an indication to indicate its priority level, instead, the user plane traffic may be divided in the upper layer and mapped to the MCG bearer and the SCG bearer, respectively. For example, in the case of layered source coding for video data, layer 0 data may be mapped to the MCG bearer (e.g., an LF in a LTE band), and layer 1 data may be mapped to the SCG bearer (e.g., a HF in a NR band). Since it is a one-to-one mapping between an EPS-bearer and a DRB, separate EPS-bearers may need to be established in a core network and mapped to the respective MCG bearer and the SCG bearer. This may be applicable for both downlink transmission and uplink transmission.

As discussed above with respect to FIG. 11, a same PDCP PDU may be sent twice, with once on the original RLC entity and a second time on the additional RLC entity. That is, two logical channels or paths are established, with one path carrying the original PDCP PDUs and another path carrying the corresponding duplicates of the original PDCP PDUs. The two paths may also be used to support communications according to the parallel scheme.

Figure 18A:
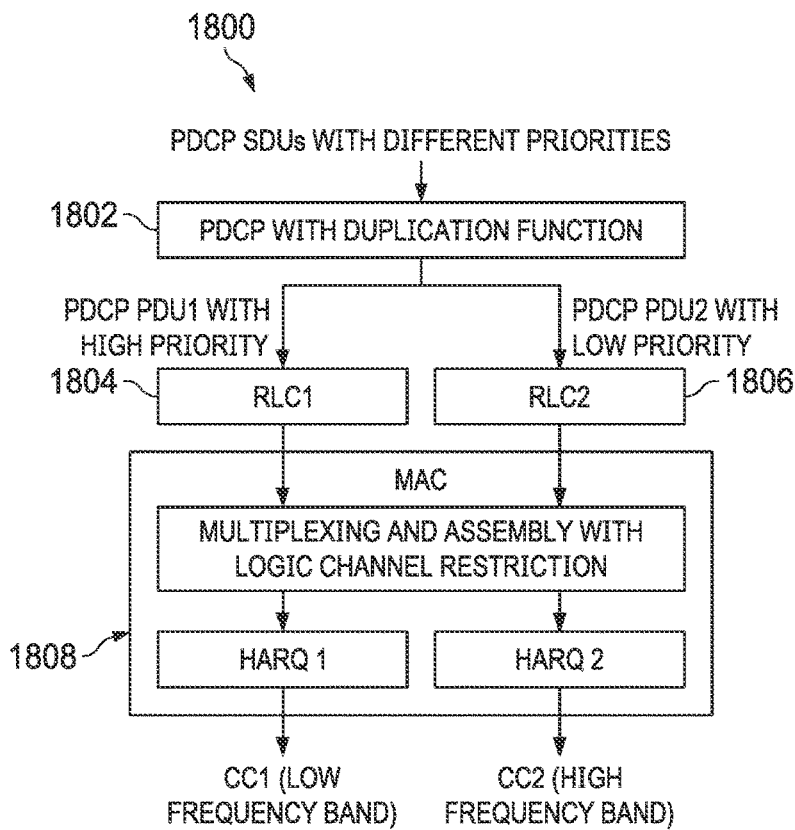
FIG. 18A illustrates a diagram of another embodiment method for wireless communications in NR CA.

FIG. 18A illustrates a diagram of an embodiment method 1800 for wireless communications. The method 1800 may be performed by a communication device, such as a base station, or a UE, that supports CA based communications in multiple CCs. For example, the communication device supports CA and is operable at a LF and a HF. As shown, a PDCP entity 1802 with duplication function receives PDCP SDUs having indications and generates PDCP PDUs. Each of the indications indicates a first priority (high priority) or a second priority (low priority lower than the first priority). An indication of a PDCP SDU may be included in a field of the PDCP SDU, as discussed above with respect to FIGS. 15-17. Two paths are established. A first path for transmitting the PDCP SDUs (i.e., the original PDCP SDUs) includes the PDCP entity 1802, a RLC entity, i.e., RLC1 1804 and a MAC entity 1808. A second path for transmitting a duplicate of the original PDCP SDUs (i.e., the PDP SDU duplicate) includes the PDCP entity 1802, a RLC entity, i.e., RLC2 1806 and the MAC entity 1808. However, instead of duplicating the PDCP SDUs, the PDCP entity 1802 sends PDCP PDUs that has the high priority, such as a PDCP PDU1, to the RLC1 1804, and sends PDCP PDUs that has the low priority, such as a PDCP PDU2, to the RLC2 1806. The RLC1 1804 is in the first path established for transmitting the original PDCP SDUs, and the RLC2 in the second path that has been established for transmitting duplicates of the original PDCP SDUs. In this example, instead of transmitting the original PDCP SDUs in the first path and transmitting the duplicates in the second path, the first path is used to transmit PDCP SDUs with high priority, and the second path is used to transmit PDCP SDUs with low priority. Each of the RLC1 1804 and RLC2 1806 generates RLC PDUs and sends the RLC PDUs to the MAC entity 1808. In the MAC layer, RLC PDUs generated by the RLC1 1804 and the RLC2 1806 are multiplexed separately, sent to different HARQ entities, i.e., HARQ 1 and HARQ 2, respectively, and transmitted in different CCs, such as CC1 and CC2, respectively.

Figure 18B:
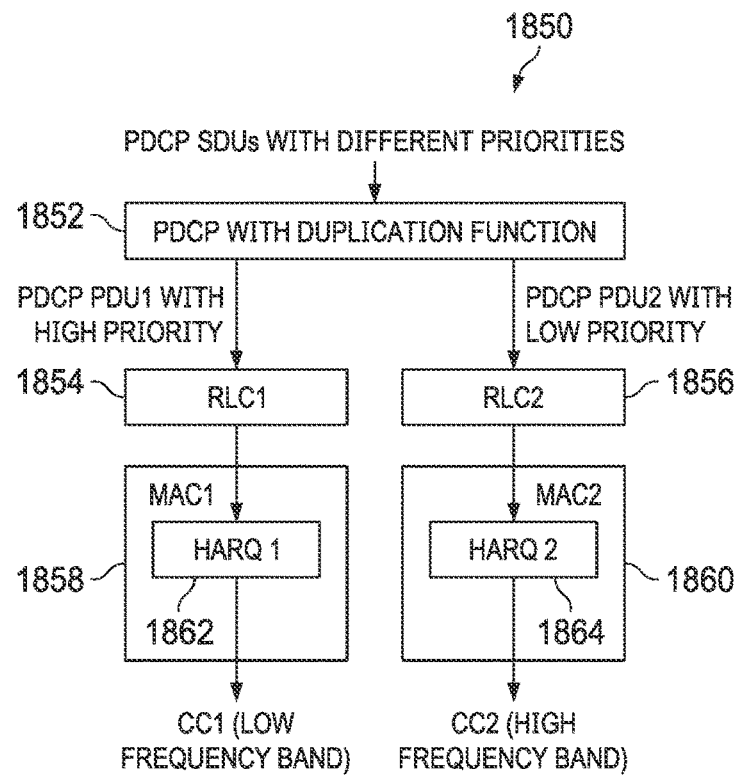
FIG. 18B illustrates a diagram of another embodiment method for wireless communications in NR DC or MR-DC.

FIG. 18B illustrates a diagram of an embodiment method 1850 for wireless communications. The method 1850 may be performed by a communication device, such as a base station or a UE, that supports DC based communications in multiple CCs. For example, the communication device supports MR-DC or NR-DC, and is operable at a LF and a HF. As shown, a PDCP entity 1852 with duplication function receives PDCP SDUs having indications of different priorities, and generates PDCP PDUs. Each of the indications indicates a first priority (high priority) or a second priority (low priority lower than the first priority). An indication of a PDCP SDU may be included in a field of the PDCP SDU, as discussed above with respect to FIGS. 15-17. When duplication is configured for a radio bearer associated with the PDCP SDUs, two paths are established. A first path for transmitting the PDCP SDUs (i.e., the original PDCP SDUs) includes the PDCP entity 1852, a RLC entity 1854, i.e., RLC1 and a MAC entity 1858, i.e., MAC1. A second path for transmitting a duplicate of the original PDCP SDUs (i.e., the PDP SDU duplicate) includes the PDCP entity 1852, a RLC entity 1856, i.e., RLC2 and a MAC entity 1860, i.e., MAC2. However, instead of duplicating the PDCP SDUs, the PDCP entity 1852 sends PDCP PDUs that has the high priority, such as a PDCP PDU1, to the RLC1 1854, and sends PDCP PDUs that has the low priority, such as a PDCP PDU2, to the RLC2 1805. The RLC1 1854 is in the first path established for transmitting the original PDCP SDUs, and the RLC2 1856 is in the second path that has been established for transmitting duplicates of the original PDCP SDUs. In this example, instead of transmitting the original PDCP SDUs in the first path and transmitting the duplicates in the second path, the first path is used to transmit PDCP SDUs with high priority, and the second path is used to transmit PDCP SDUs with low priority. Each of the RLC1 1854 and RLC2 1856 generates RLC PDUs, and sends the RLC PDUs to their respective MAC entities 1858 and 1860. In the MAC layer, respective RLC PDUs generated by the RLC1 1804 and the RLC2 1806 are sent to HARQ 1 and HARQ 2, respectively, and transmitted in different CCs, such as CC1 and CC2, respectively.

The method 1850 may be applied for transmitting PDCP SDUs mapped to a MCG bearer, a SCG bearer, and/or a split bearer. When the communication device is a UE, the PDCP entity may send a PDU, based on an indication of the PDU, to an E-UTRA RLC or a NR RLC, or to a MN RLC or a SN RLC, through two paths established for transmitting the PDU and a duplicate of the PDU. When the communication device is a base station, the PDCP entity may be in a MN or a SN. The PDCP entity may send a PDU to a MN RLC or a SN RLC, through two paths established for transmitting the PDU and a duplicate of the PDU.

As described above, according to the parallel scheme, in a system supporting communications in two different carrier frequencies, i.e., an LF and an HF, e.g., supporting DC or CA, data packets to be transmitted by a communication device, e.g., a base station or a UE, may be provided with indications (or labels). An indication of a data packet indicates a priority level of the data packet. The priority level may be a high priority or a low priority. A data packet with a high priority will be transmitted in the LF, e.g., in the LTE band or NR sub-6 GHz, and a data packet with a low priority will be transmitted in the HF, e.g., in the mmWave band. A communication device transmitting data packets of different priority levels may, based on the indications of priority levels, transmit the data packets in different paths, i.e., transmit to different RLC entities. Specifically, in the case of MR-DC, a base station may, based on the indications of priority levels, transmit a data packet by itself, or direct another base station to transmit the data packet. An indication may indicate whether the data packet has the high priority or the low priority. In one embodiment, the indication may directly indicate whether the data packet should be transmitted in the LF or the HF. A data packet may include a field to contain the indication, e.g., as describe with respect to FIG. 15, 16 or 17. The field may use one bit to indicate a high priority (to be transmitted in the LF) or a low priority (to be transmitted in the HF). The field may also use one bit to indicate a LF (to be transmitted in the LF) or a HF (o be transmitted in the HF). The indication may also be a flag to indicate a priority level (high or low), or indicate a LF or a HF.

Retransmission Scheme

According to some embodiments in the retransmission scheme, in a communications system supporting communications in both a LF band and a HF band, user plane traffic data of a service provided by the system may firstly be transmitted in the HF band, e.g., an mmWave band. This transmission is referred to as a first transmission of the user plane traffic data. If the first transmission fails, a retransmission may be directed to the LF band, e.g., a LTE band or NR sub-6 GHz band. That is, retransmission of the data may be performed in the LF. As has been shown, in MAC layer HARQ, a target successful rate of the first transmission may be around 90%. Based on this statistic data, by use of the retransmission scheme and in the case of a stable mmWave link, 90% of the data may be conveyed in the mmWave band, and only 10% data may need to be retransmitted in the LF band. As a result, a UE with mmWave capability may fully enjoy the benefit of wide bandwidth in the mmWave band. When the mmWave link deteriorates, e.g., due to blockage or UE movement, the data may be smoothly directed to the LF band and the service may thus be properly maintained. In the worst scenario, where a radio link failure has occurred in the mmWave band, the system may skip the first transmission in the mmWave band and all the user traffic may be directed to the LF band. In this case, the system performs transmission only using the LF band.

In the NR protocol stack, layer 2 includes MAC, RLC, PDCP and SDAP layers, as shown in FIG. 5. In the RLC layer, there are three data transfer modes, i.e., transparent mode (TM), unacknowledged mode (UM) and acknowledged mode (AM). For AM mode, ARQ procedures are performed by an RLC entity in the AM mode (referred to as an AM RLC entity). A RLC SDU segment may be retransmitted up to maxRetxThreshold times. When the maximum retransmission number has been reached, the AM RLC entity indicates or reports to the PDCP entity that maxRetxThreshold times of retransmission has been done. Upon receipt of such an indication or report, the PDCP entity determines that RLC transmission of the SDU segment fails.

Figure 19:
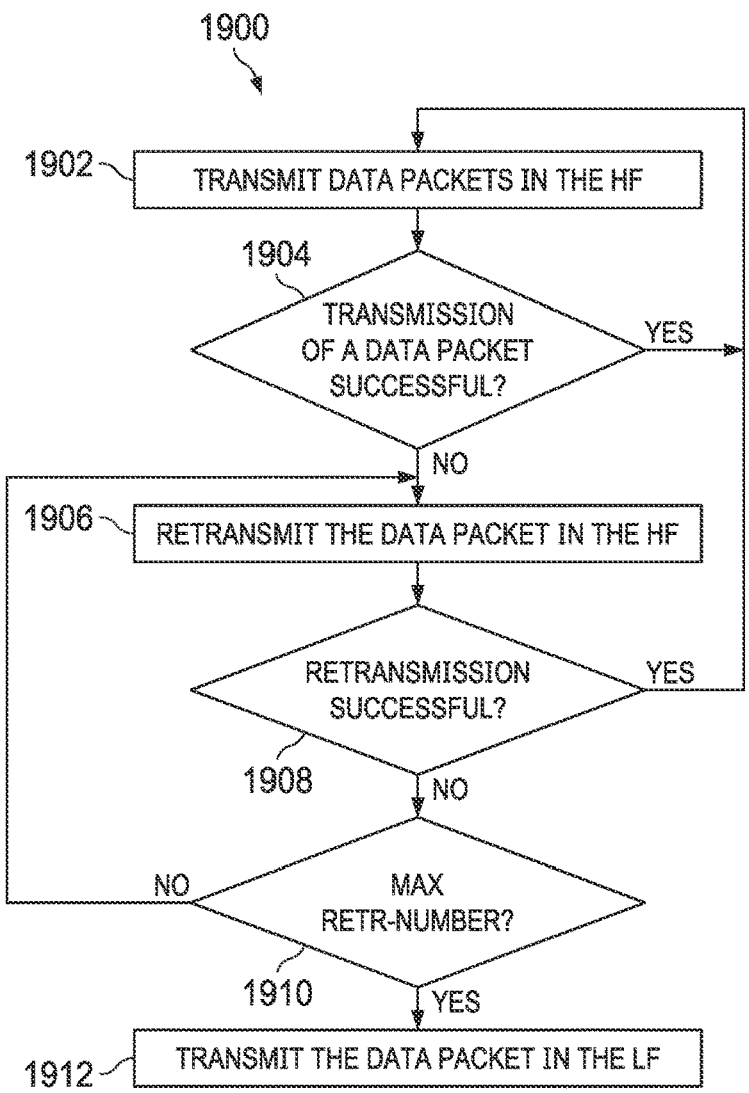
FIG. 19 illustrates a flowchart of an embodiment method for retransmission.

FIG. 19 illustrates a flowchart of an embodiment method 1900 for retransmission. The method 1900 may be performed by a communication device, such as a UE, or a base station, that supports communications in two different CCs, e.g., in the case of DC or CA operating at a LF and a HF. As shown, at step 1902, the communication device transmits data packets in the HF. At step 1904, the communication device determines whether transmission of a data packet is successful. This may be based on whether or not the communication device receives an acknowledgement acknowledging receipt of the data packet. When the transmission of the data packet is successful, the communication devices goes back to step 1902 to continue transmit other data packets in the HF. When the transmission of the data packet is not successful, at step 1906, the communication device retransmits the data packet in the HF. At step 1908, the communication device determines whether the retransmission is successful. If the retransmission is successful, the communication device goes back to step 1902. If the retransmission is not successful, at step 1910, the communication device determines whether it has reached a maximum number of retransmission (e.g., maxRetxThreshold) in the HF for the data packet. The maximum number of retransmission may be configured as one (1), or may be configurable based on HF (e.g., an mmWave frequency) link reliability. If it has not reached the maximum number of retransmission, the communication device goes back to the step 1906 to retransmit the data packet again. If it has reached the maximum number of retransmission, at step 1912, the communication device transmits the data packet in the LF.

During transmission of the data packet in the LF at the step 1912, the communication device may also perform steps similar to the steps of 1904-1910, with the carrier frequency in the LF, instead of the HF. In addition, the maximum number of retransmission for the LF may be the same as or different than that for the HF. If transmission of the data packet in the HF is not successful (e.g., fails after the maximum number of retransmission), the data packet may be discarded, or retransmitted after a predefined period of time.

During transmission in the HF, e.g., in the step of 1902 or 1906, the communication device may also determine whether a radio link failure in the HF occurs. If the radio link failure occurs in the HF, the communication device may proceed to the step 1912, where the communication device transmits the data packet and other data packets thereafter in the LF only. The communication device may resume transmission of data packets in the HF link according to the method 1900 after the radio link failure in the HF is recovered.

In a case that the communication device supports MR-DC with EPC, data packets to be transmitted according to the embodiment method 1900 may be mapped to the split bearer. A PDCP entity receives a data packet to be transmitted from the split bearer, and directs the data packet to the NR RLC entity for the first transmission. The PDCP sends the data packet to the NR RLC entity, which then sends the data packet to the NR MAC entity for transmission in the HF. If the first transmission is not successful, the NR RLC entity may retransmit the data packet up to a maximum number. If retransmission of the data packet is not successful after the maximum number of retransmission, the NR RLC entity may send a failure indication to the PDCP entity, indicating that transmission of the data packet in the HF has failed. The failure indication does not trigger radio link failure. When the PDCP entity receives the failure indication, the PDCP entity may direct the data packet to the E-UTRA RLC entity so that the data packet may be transmitted in the LF. In a case where the HF link has radio link failure, the PDCP entity may direct data packets to the E-UTRA RLC entity for transmission in the LF only.

In a case that the communication device supports MR-DC with 5GC, data packets to be transmitted according to the embodiment method 1900 may be mapped to the split bearer. A NR PDCP entity receives a data packet to be transmitted from the split bearer, and directs the data packet to a RLC entity in the HF link for the first transmission. When transmission of the data packet in the HF link fails, the PDCP entity directs the data packet to a RLC entity in the LF link for transmission. For example, in NGEN-DC where E-UTRA is used in the MN and NR is used in the SN, the PDCP entity sends the data packet to the SN RLC entity, which then sends the data packet to the SN MAC entity for transmission in the HF. If the first transmission is not successful, the SN RLC entity may retransmit the data packet up to a maximum number. If retransmission of the data packet is not successful after the maximum number of retransmission, the SN RLC entity may send a failure indication to the PDCP entity, indicating that transmission of the data packet has failed. The failure indication does not trigger radio link failure. When the PDCP entity receives the failure indication, the PDCP entity may direct the data packet to the MN RLC entity so that the data packet may be transmitted in the LF. In a case where the HF link (SN) has radio link failure, the PDCP entity will also direct data packets to the MN RLC entity for transmission in the LF only.

Similarly, in NE-DC where E-UTRA is used in the SN and NR is used in the MN, a NR PDCP entity may direct the data packet to an MN RLC entity for the first transmission of in the HF. When transmission of the data packet by the MN RLC entity fails after the maximum number of retransmission, the PDCP receives a failure indication, and may direct the data packet to an SN RLC entity for transmitting the data packet in the SN (LF). In a case where the HF link (MN) has radio link failure, the PDCP entity may direct data packets to the SN RLC entity for transmission in the LF only.

In NR-DC where NR is used in both the MN and the SN, one of the MN and SN may use mmWave band and the other one may use LF (sub-6 GHz) band. As an illustrative example, the MN is using mmWave band and the SN is using LF band. A NR PDCP entity may direct the data packet to an MN RLC entity for the first transmission of in the HF. When transmission of the data packet by the MN RLC entity fails after the maximum number of retransmission, the NR PDCP entity receives a failure indication, and may direct the data packet to an SN RLC entity for transmitting the data packet in the SN (LF). In a case where the HF link (MN) has radio link failure, the PDCP entity may direct data packets to the SN RLC entity for transmission in the LF only.

In a case that the communication device supports NR-CA or NR-DC or MR-DC, transmission of data packets according to the embodiment method 1900 may make use of the two paths established for transmitting an original data packet and a duplicate of the original data packet (referring back to FIG. 11A or FIG. 11B). In one embodiment, one of the two paths (i.e., a first path) may be mapped to the LF (in a LTE band of a band below 6 GHz), and the other path (i.e., a second path) may be mapped to the HF (in the mmWave band). That is, data packets in the first path are transmitted in the LF, and data packets in the second path are transmitted in the HF. When a PDCP entity with duplication function receives a data packet to be transmitted, the PDCP entity directs the data packet to the second path mapped to the HF for the first transmission of the data packet. The first path does not transmit the data packet. If the first transmission fails, the same data packet may be retransmitted in the first path in the LF. In the case of NR-CA, the maximum retransmission number for the HF may be set to 0. In another example, if the first transmission in the second path fails, the data packet may be retransmitted in the second path until a maximum number of retransmission is reached, in which case, the data packet may thereafter be retransmitted in the first path in the LF.

Figure 20:
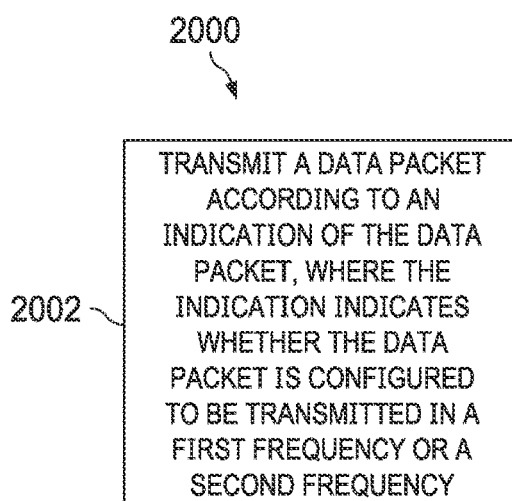
FIG. 20 illustrates a flowchart of an embodiment method for wireless communications.

FIG. 20 illustrates a flowchart of an embodiment method 2000 for wireless communications. The method 2000 may be performed by a communication device, such as a base station or a user equipment (UE), which is configured to communicate in a first frequency of a first carrier and a second frequency of a second carrier. As shown, at step 2002, the communication device transmits a data packet according an indication of the data packet, where the indication indicates whether the data packet is configured to be transmitted in the first frequency or the second frequency. The first frequency is different than the second frequency.

Figure 21:
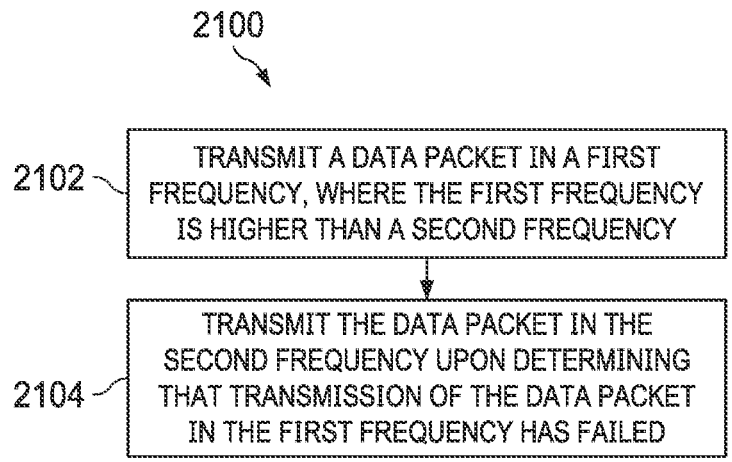
FIG. 21 illustrates a flowchart of another embodiment method for wireless communications.

FIG. 21 illustrates a flowchart of another embodiment method 2100 for wireless communications. The method 2100 may be performed by a communication device, such as a base station or a user equipment (UE), which is configured to communicate in a first frequency of a first carrier and a second frequency of a second carrier. As shown, at step 2102, the communication device transmits a data packet in the first frequency, where the first frequency is higher than the second frequency. At step 2104, the communication device transmits the data packet in the second frequency upon determining that transmission of the data packet in the first frequency has failed.

Figure 22:
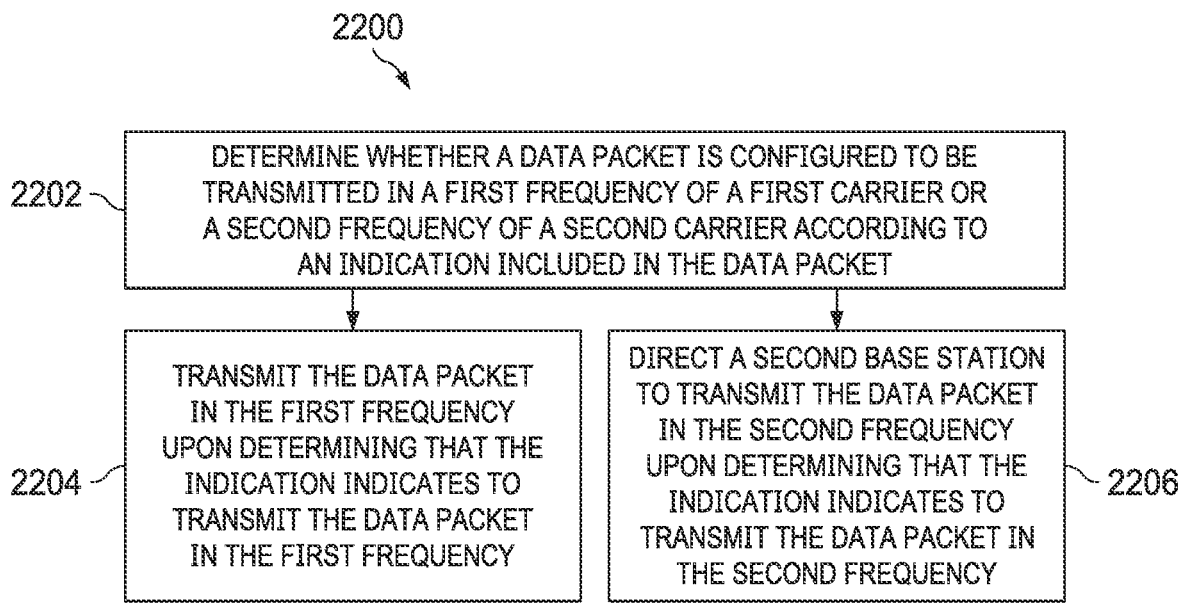
FIG. 22 illustrates a flowchart of another embodiment method for wireless communications.

FIG. 22 illustrates a flowchart of another embodiment method 2200 for wireless communications. The method 2200 may be performed by a first base station configured to provide dual connectivity (DC) based communications with a second base station. As show, at step 2202, the first base station determines whether a data packet is configured to be transmitted in a first frequency of a first carrier or a second frequency of a second carrier according to an indication included in the data packet. The first frequency is different than the second frequency. At step 2204, the first base station transmits the data packet in the first frequency upon determining that the indication indicates to transmit the data packet in the first frequency. The first base station is configured to communicate in the first frequency of the first carrier. At step 2206, the first base station directs the second base station to transmit the data packet in the second frequency upon determining that the indication indicates to transmit the data packet in the second frequency. The second base station is configured to communicate in the second frequency of the second carrier.

Figure 23:
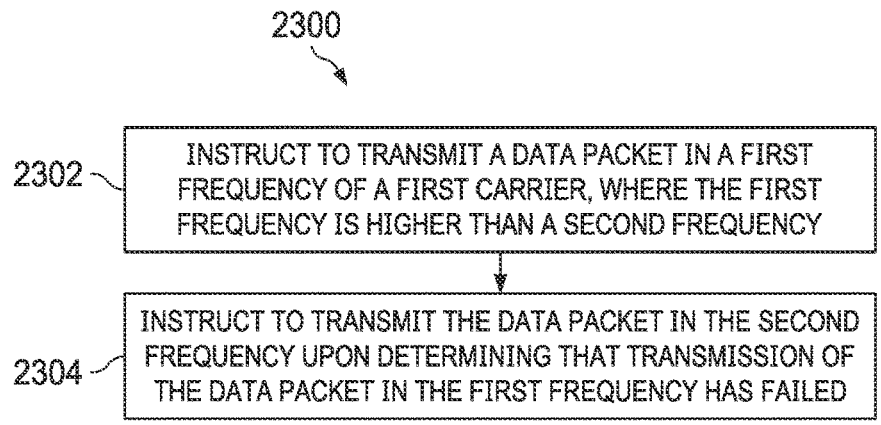
FIG. 23 illustrates a flowchart of another embodiment method for wireless communications.

FIG. 23 illustrates a flowchart of another embodiment method 2300 for wireless communications. The method 2300 may be performed by a first base station that is configured to provide dual connectivity with a second base station in a first frequency of a first carrier and a second frequency of a second carrier. As shown, at step 2302, the first base station instructs to transmit a data packet in the first frequency of the first carrier, where the first frequency is higher than the second frequency. The data packet is from a split bearer. At step 2304, the first base station instructs to transmit the data packet in the second frequency upon determining that transmission of the data packet in the first frequency has failed.

Figure 24:
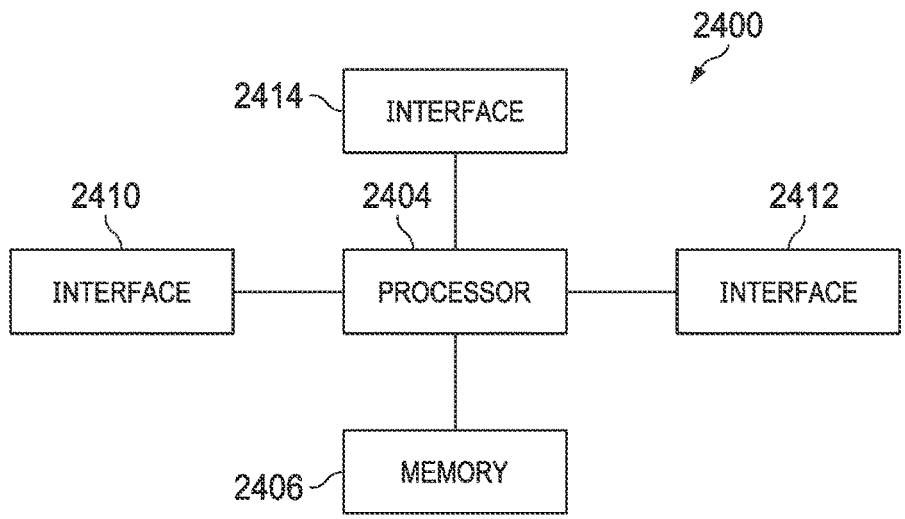
FIG. 24 illustrates a diagram of an embodiment processing system.

Embodiments of the present disclosure may be implemented as computer-implemented methods. The embodiments may be performed by a processing system. FIG. 24 illustrates a block diagram of an embodiment processing system 2400 for performing methods described herein, which may be installed in a host device. As shown, the processing system 2400 includes a processor 2404, a memory 2406, and interfaces 2410-2414, which may (or may not) be arranged as shown in FIG. 24. The processor 2404 may be any component or collection of components adapted to perform computations and/or other processing related tasks, and the memory 2406 may be any component or collection of components adapted to store programming and/or instructions for execution by the processor 2404. In an embodiment, the memory 2406 includes a non-transitory computer readable medium. The interfaces 2410, 2412, 2414 may be any component or collection of components that allow the processing system 2400 to communicate with other devices/components and/or a user. For example, one or more of the interfaces 2410, 2412, 2414 may be adapted to communicate data, control, or management messages from the processor 2404 to applications installed on the host device and/or a remote device. As another example, one or more of the interfaces 2410, 2412, 2414 may be adapted to allow a user or user device (e.g., personal computer (PC), etc.) to interact/communicate with the processing system 2400. The processing system 2400 may include additional components not depicted in FIG. 24, such as long term storage (e.g., non-volatile memory, etc.).

In some embodiments, the processing system 2400 is included in a network device that is accessing, or part otherwise of, a telecommunications network. In one example, the processing system 2400 is in a network-side device in a wireless or wireline telecommunications network, such as a base station, a relay station, a scheduler, a controller, a gateway, a router, an applications server, or any other device in the telecommunications network. In other embodiments, the processing system 2400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 25:
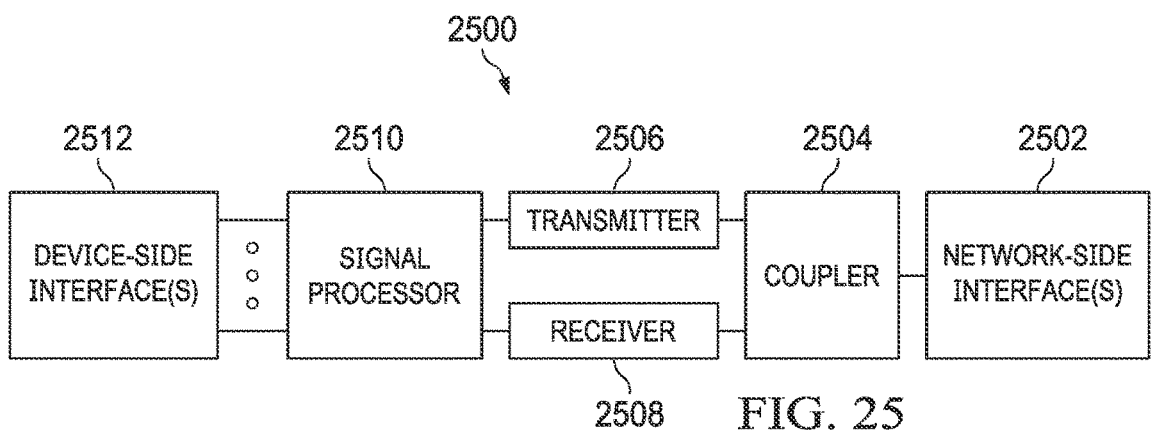
FIG. 25 illustrates a diagram of an embodiment transceiver.

In some embodiments, one or more of the interfaces 2410, 2412, 2414 connects the processing system 2400 to a transceiver adapted to transmit and receive signaling over the telecommunications network. FIG. 25 illustrates a block diagram of a transceiver 2500 adapted to transmit and receive signaling over a telecommunications network. The transceiver 2500 may be installed in a host device. As shown, the transceiver 2500 comprises a network-side interface 2502, a coupler 2504, a transmitter 2506, a receiver 2508, a signal processor 2510, and a device-side interface 2512. The network-side interface 2502 may include any component or collection of components adapted to transmit or receive signaling over a wireless or wireline telecommunications network. The coupler 2504 may include any component or collection of components adapted to facilitate bi-directional communication over the network-side interface 2502. The transmitter 2506 may include any component or collection of components (e.g., up-converter, power amplifier, etc.) adapted to convert a baseband signal into a modulated carrier signal suitable for transmission over the network-side interface 2502. The receiver 2508 may include any component or collection of components (e.g., down-converter, low noise amplifier, etc.) adapted to convert a carrier signal received over the network-side interface 2502 into a baseband signal. The signal processor 2510 may include any component or collection of components adapted to convert a baseband signal into a data signal suitable for communication over the device-side interface(s) 2512, or vice-versa. The device-side interface(s) 2512 may include any component or collection of components adapted to communicate data-signals between the signal processor 2510 and components within the host device (e.g., the processing system 2400, local area network (LAN) ports, etc.).

The transceiver 2500 may transmit and receive signaling over any type of communications medium. In some embodiments, the transceiver 2500 transmits and receives signaling over a wireless medium. For example, the transceiver 2500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2502 comprises one or more antenna/radiating elements. For example, the network-side interface 2502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a communicating unit/module, a directing unit/module, an instructing unit/module, a determining unit/module, a retransmitting unit/module, and/or an indicating unit/module. The respective units/modules may be hardware, software, or a combination thereof. For instance, one or more of the units/modules may be an integrated circuit, such as field programmable gate arrays (FPGAs) or application-specific integrated circuits (ASICs).

The following references are related to subject matter of the present application. Each of these references is incorporated herein by reference in its entirety:

3GPP TS 37.340 V15.4.0, "3rd Generation Partnership Project; Technical Specification Group Radio Access Network; Evolved Universal Terrestrial Radio Access (E-UTRA) and NR; Multi-connectivity; Stage 2 (Release 15)", (2018 December).

3GPP TS 38.300 V15.4.0, "3rd Generation Partnership Project; Technical Specification Group Radio Access Network; NR; NR and NG-RAN Overall Description; Stage 2 (Release 15)", (2018 December).

3GPP TS 21.905 V15.0.0, "3rd Generation Partnership Project; Technical Specification Group Services and System Aspects; Vocabulary for 3GPP Specifications (Release 15)", (2018 March).

3GPP TS 38.323 V15.4.0, "3rd Generation Partnership Project; Technical Specification Group Radio Access Network; NR; Packet Data Convergence Protocol (PDCP) specification (Release 15)", (2018 December).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for wireless communications, comprising:
transmitting, by a communication device configured to communicate in a first frequency of a first carrier and a second frequency of a second carrier, a data packet to a second communication device according to an indication of the data packet, the indication indicating whether the data packet is configured to be transmitted in the first frequency or the second frequency, and the first frequency being different than the second frequency, wherein the indication is comprised in the data packet,
wherein the indication further indicates a priority level of the data packet, the priority level being associated with one of the first frequency and the second frequency, and
wherein the communication device is a user equipment (UE), and the second communication device comprises a first base station, or wherein the communication device is the first base station and the second communication device is the UE.

2. The method of claim 1, wherein the communication device is the first base station.

3. The method of claim 1, wherein the communication device is the UE.

4. The method of claim 3, wherein the UE is configured to communicate with the first base station in the first frequency and with a second base station in the second frequency, and the data packet is mapped to a split bearer.

5. The method of claim 4, wherein one of the first base station and the second base station is an eNB, and the other one of the first base station and the second base station is an en-gNB.

6. The method of claim 4, wherein one of the first base station and the second base station is an ng-eNB, and the other one of the first base station and the second base station is a gNB.

7. The method of claim 4, wherein one of the first base station and the second base station is a gNB, and the other one of the first base station and the second base station is an ng-eNB.

8. The method of claim 4, wherein one of the first base station and the second base station is a master node, and the other one of the first base station and the second base station is a secondary node.

9. The method of claim 1, wherein one of the first frequency and the second frequency is in a frequency band above 6 GHz, and the other one is in a frequency band below 6 GHz.

10. The method of claim 1, wherein the indication indicates a first priority level of the data packet, the first priority level is higher than a second priority level, and wherein transmitting the data packet comprises:
    transmitting the data packet in the first frequency that is lower than the second frequency.

11. The method of claim 1, wherein the first carrier is associated with a first logical channel, and the second carrier is associated with a second logical channel that is a duplicate of the first logical channel.

12. The method of claim 1, wherein the indication is comprised in a header of the data packet.

13. A communication device configured to communicate in a first frequency of a first carrier and a second frequency of a second carrier, the communication device comprising:
    a non-transitory memory storage comprising instructions; and
    one or more processors in communication with the non-transitory memory storage, wherein the one or more processors execute the instructions to:
    transmit a data packet to a second communication device according to an indication of the data packet, the indication indicating whether the data packet is configured to be transmitted in the first frequency or the second frequency, and the first frequency being different than the second frequency, wherein the indication is comprised in the data packet,
    wherein the indication further indicates a priority level of the data packet, the priority level being associated with one of the first frequency and the second frequency, and
    wherein the communication device is a user equipment (UE), and the second communication device comprises a first base station, or wherein the communication device is the first base station and the second communication device is the UE.

14. A method comprising:
    transmitting, by a communication device configured to communicate in a first frequency of a first carrier and a second frequency of a second carrier, a data packet in the first frequency to a second communication device according to an indication of the data packet, the first frequency being higher than the second frequency; and
    re-transmitting, by the communication device, the data packet in the second frequency in response to determining that transmission of the data packet in the first frequency has failed,
    wherein the indication indicates a priority level of the data packet, the priority level being associated with one of the first frequency and the second frequency, and
    wherein the communication device is a user equipment (UE), and the second communication device comprises a first base station, or wherein the communication device is the first base station and the second communication device is the UE.

15. The method of claim 14, wherein the first frequency is in a frequency band above 6 GHZ, and the second frequency is in a frequency band that is below 6 GHz.

16. The method of claim 14, wherein the first frequency and the second frequency are in a frequency band above 6 GHz.

17. The method of claim 14, wherein the communication device is the first base station.

18. The method of claim 14, wherein the communication device is the UE.

19. The method of claim 18, wherein the UE is configured to communicate with the first base station in the first frequency and with a second base station in the second frequency, and the data packet is mapped to a split bearer.

20. The method of claim 19, wherein the first base station is an en-gNB, and the second base station is an eNB.

21. The method of claim 19, wherein the first base station is a gNB, and the second base station is an ng-eNB.

22. The method of claim 19, wherein the second base station is a gNB, and the first base station is an ng-eNB.

23. The method of claim 19, wherein one of the first base station and the second base station is a master node, and the other one is a secondary node.

24. The method of claim 14, wherein one of the first carrier and the second carrier is associated with a first logical channel, and the other one of the first carrier and the second carrier is associated with a second logical channel that is a duplicate of the first logical channel.

25. A communication device configured to communicate in a first frequency of a first carrier and a second frequency of a second carrier, the communication device comprising:
    a non-transitory memory storage comprising instructions; and
    one or more processors in communication with the non-transitory memory storage, wherein the one or more processors execute the instructions to:
    transmit a data packet in the first frequency to a second communication device according to an indication of the data packet, the first frequency being higher than the second frequency; and
    re-transmit the data packet in the second frequency in response to determining that transmission of the data packet in the first frequency has failed,
    wherein the indication indicates a priority level of the data packet, the priority level being associated with one of the first frequency and the second frequency, and wherein the communication device is a user equipment (UE), and the second communication device comprises a first base station, or wherein the communication device is the first base station and the second communication device is the UE.

* * * * *